(12) United States Patent
Guionnet et al.

(10) Patent No.: US 9,591,146 B2
(45) Date of Patent: Mar. 7, 2017

(54) METHOD AND APPARATUS FOR FLEXIBLE BALANCE MANAGEMENT USING RESERVATION CONSUMPTION

(71) Applicant: Oracle International Corporation, Redwood Shores, CA (US)

(72) Inventors: Jerome Guionnet, Palo Alto, CA (US); Richard Tasker, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 157 days.

(21) Appl. No.: 14/503,160

(22) Filed: Sep. 30, 2014

(65) Prior Publication Data
US 2015/0094017 A1 Apr. 2, 2015

Related U.S. Application Data

(60) Provisional application No. 61/884,661, filed on Sep. 30, 2013.

(51) Int. Cl.
*H04M 15/00* (2006.01)

(52) U.S. Cl.
CPC ......... *H04M 15/723* (2013.01); *H04M 15/60* (2013.01); *H04M 15/854* (2013.01); *H04M 15/43* (2013.01); *H04M 15/70* (2013.01); *H04M 15/705* (2013.01); *H04M 15/785* (2013.01); *H04M 15/8214* (2013.01); *H04M 15/852* (2013.01); *H04M 15/857* (2013.01)

(58) Field of Classification Search
CPC ......... H04W 4/24; H04W 4/26; H04M 15/60; H04M 15/723; H04M 15/8214; H04M 15/854; H04M 15/43; H04M 15/70; H04M 15/705; H04M 15/785; H04M 15/852; H04M 15/857
See application file for complete search history.

(56) References Cited

U.S. PATENT DOCUMENTS

2008/0057916 A1* 3/2008 Gamm ................. H04M 15/59
455/414.1

* cited by examiner

*Primary Examiner* — Chuong A Ngo
(74) *Attorney, Agent, or Firm* — Jenkins, Wilson, Taylor & Hunt, P.A.

(57) ABSTRACT

A method, system, and computer-program product for flexible balance management using reservation consumption are disclosed. For example, a method according to embodiments of the methods and systems disclosed herein includes receiving a request message and, in response to the receiving the request message, updating a consumed reservation balance.

20 Claims, 21 Drawing Sheets

METHOD AND APPARATUS FOR FLEXIBLE BALANCE MANAGEMENT USING RESERVATION CONSUMPTION

CROSS-REFERENCE TO RELATED APPLICATIONS

The present patent application claims priority to Provisional Patent Application Ser. No. 61/884,661, filed Sep. 30, 2013, which is hereby incorporated by reference herein, in its entirety and for all purposes.

FIELD OF THE INVENTION

The present invention relates to charging for services, and, more particularly, to a method and system for flexible balance management using reservation consumption.

COPYRIGHT NOTICE/PERMISSION

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Service providers are experiencing ever-growing service usage by subscribers. A service provider implements a charging system in which subscribers are charged for their service usage. An example charging system may implement a policy and charging control solution, such as that developed under 3GPP™ ($3^{rd}$ Generation Partnership Project) IMS (Internet Protocol Multimedia Subsystems) and provides a new standard for charging system business models.

In addition to overall data volume, mobile connected digital devices (e.g., mobile devices such as smart phones and tablets) and the applications that run on them are also driving a change in consumer behavior. The manner in which consumers interact with one another at work, home, and leisure has changed dramatically within the last decade, prompting a new term to describe consumer behavior—the digital lifestyle. The digital lifestyle also introduces a multitude of new players within the communications landscape, including the so called over-the-top (OTT) providers, on which consumers rely within their daily lives, and often trust and admire.

The digital lifestyle, in turn, has characteristics that reflect the attitudes of consumers immersed in this new economy. Consumers expect to be "always on," that is, they expect to be constantly connected, no matter what their location or device they happen to be using. Along with the instant gratification expected from such a real-time communications environment, consumers also require a certain amount of personalization and control. They want service plans and tariffs that correspond and are tailored to their particular lifestyle, and they want the control to be able to adjust their plans whenever they wish. And, they expect that their experience with their service provider to be simple, easy, and predictable, with no surprises.

The digital world in which we live, work, play, and socialize has thus created immense opportunities for communications service providers, however serious pressures and challenges must be overcome. Communications service providers understand, embrace and tackle those challenges head-on will be the ones that thrive, as revenue opportunities are abundant for communications service providers in this new digital economy.

Service providers (e.g., telecommunications operators and the like) commonly provide pre-paid services to their customers (commonly referred to as subscribers). Such pre-paid services can take the form "free minutes" (e.g., credit for so many minutes of calls (or a dollar value therefor, purchased on a monthly basis, for example), "free megabytes" (e.g., credit for a given amount of data usage, purchased on a monthly basis, for example), "free messages" (e.g., credit for some number of texts, purchased on a monthly basis, for example), and the like, or where the customer pre-pays a certain amount into their account in order to hold a credit balance, which is then used in order to provide service. However, traditional approaches to maintaining and providing information regarding subscribers' accounts and their use of such services has failed to keep pace with innovations in this area, and thus has failed to meet the needs and expectations of subscribers and service providers alike.

SUMMARY OF THE INVENTION

In one embodiment, a method, system, and computer-program product for flexible balance management using reservation consumption are disclosed. For example, a method according to embodiments of the methods and systems disclosed herein includes receiving a request message and, in response to the receiving the request message, updating a consumed reservation balance.

BRIEF DESCRIPTION OF THE DRAWINGS

The present invention may be better understood, and its numerous objects, features and advantages made apparent to those skilled in the art by referencing the accompanying drawings.

Figure 1A:
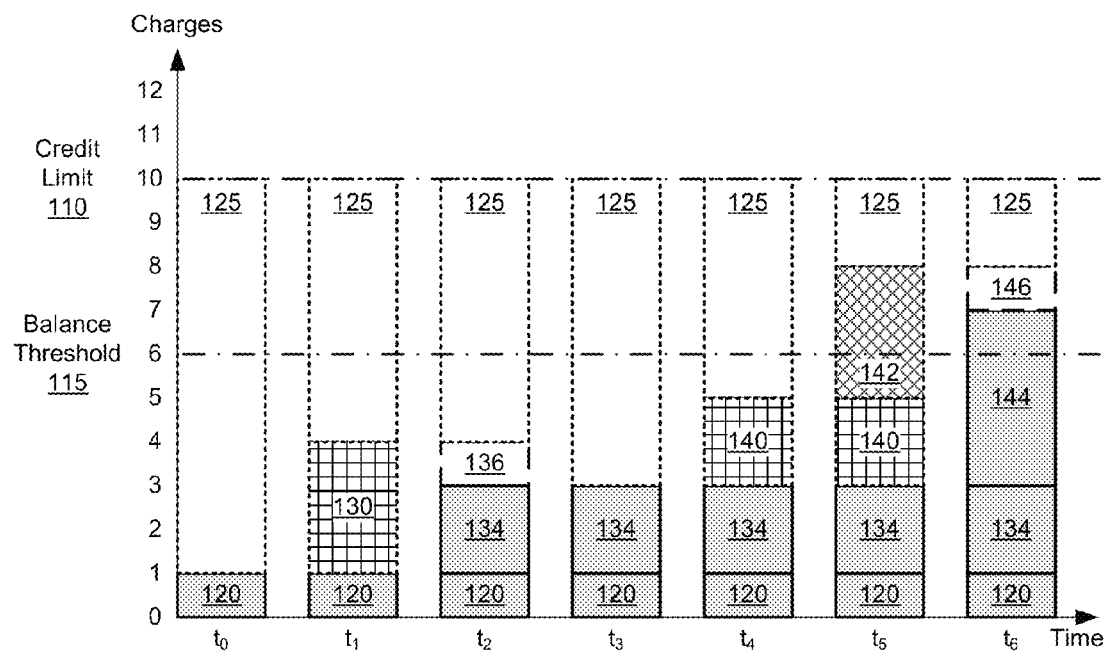
FIG. 1A is a simplified block diagram illustrating an example of a charging timeline.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the systems described herein and equivalents thereof, as defined solely by the claims, will become apparent in view of the examples described in the detailed description set forth below.

DETAILED DESCRIPTION

Introduction

A charging system according to embodiments of the methods and systems disclosed herein addresses the needs of subscribers and service providers by providing mechanisms and functionality supporting the concept of a consumed balance reservation, as well as other related concepts (e.g., active balance reservation, communications supporting such features, systems designed to support such features and communications, and the like). Such approaches provide advantages such as allowing a billing system to notify the subscriber that their balance has crossed a defined threshold (based on consumed balance reservations and/or active balance reservations). Such approaches can also be used to allow service providers to recognize the revenue earlier than would otherwise be the case, and to allow service providers to apprise subscribers of such usage more accurately and in a more timely fashion. In so doing, such solutions provide balance transparency to the subscriber and accurate notification of balance thresholds based on their actual usage of data during the course of ongoing sessions. Such systems also provide operators with the ability to classify revenue as earned earlier than without this capability.

In the provision of pre-paid services, the operator (service provider) receives a request for service (also referred to as an authorization request) from the network session controller (e.g., a mobile switching server (MSC) in a Global System for Mobile Communications (GSM) network) and the operators charging and billing platform responds by granting a quota of balance which is reserved from the subscriber's balance so that other services (e.g., streaming video) can simultaneously access the same subscriber balance without risk of consuming more balance than is available. Long running sessions, which are becoming more and more common with always-on data services, result is large reservations of balance. These reservations cannot be considered as committed usage until the session is terminated and until terminated the revenue that would accrue from that usage cannot be recognized as earned (in the financial sense). Also, reserving extremely large quantities for long running sessions means that other services wishing to use the same balance might not have access to enough balance due to the large outstanding reservation. Notifications of balance thresholds is also based solely on terminated sessions which limits the transparency to the subscriber of their current financial position. Service providers must periodically cut long running sessions in order to be able to recognize the revenue for the usage already consumed by their subscribers which can potentially result in a reduced customer experience.

Example Systems and Processes

FIG. 1A is a simplified block diagram illustrating an example of a charging timeline 100. Charging timeline 100 illustrates certain of the problems that can be encountered by charging systems. As can be seen in FIG. 1A, a simplified version of such situations (and depicted thusly for purposes of clarity), time proceeds from a time $t_0$ through $t_6$ (and beyond) on an X-axis of charging timeline 100, while charges range from zero to twelve (and beyond) on a Y-axis of charging timeline 100. Also depicted in FIG. 1A is a credit limit 110, which indicates a maximum amount of charges allowable for the given subscriber account. In this regard, a subscriber may elect to set a balance threshold (depicted in FIG. 1A as a balance threshold 115), and in so doing, request an alert of some sort, indicating that the subscriber's current balance has exceeded such a threshold.

In the scenario depicted in FIG. 1A, the subscriber's account begins with an opening balance (depicted in FIG. 1A as a committed balance 120) and an available balance (depicted in FIG. 1A as an available balance 125). As can be seen in FIG. 1A, available balance 125 is the amount of credit available in the subscriber's account, up to the account's credit limit (depicted in FIG. 1A as credit limit 110). Viewed another way, committed balance 120 and available balance 125, taken together, aggregate to credit limit 110 (as is depicted in the example in FIG. 1A at time $t_0$). At a time subsequent to time $t_0$, the subscriber initiates a communications session (e.g., by initiating a voice call using a cell phone). Thus (e.g., at a time $t_1$), the charging system receives an indication of this event, and begins its accounting for such service. In response, the charging system reserves a balance reservation in a given amount (e.g., an amount indicated in the authorization request), which is depicted in FIG. 1A as balance reservation 130, and sends a reply, indicating that the requested balance reservation has been reserved and that the request has been granted.

The subscriber's communications session (voice call) proceeds until a subsequent time, at which point the communications session ends, and the portion of the balance reservation (balance reservation 130) actually used in the communications session, is committed. Such a situation is depicted in FIG. 1A at a time $t_2$, at which point the portion of balance reservation 130 that has actually been used is accounted for (depicted in FIG. 1A at committed balance 134). The unused portion of balance reservation 130 thus appears as unused balance reservation 136. As will be appreciated, while unused balance reservation 136 is shown at time $t_2$ as part of the charging of the used portion of balance reservation 130 (i.e., committed balance 134), unused balance reservation 136 is, in fact, simply returned to available balance 125 (as appears at time $t_3$).

At some time subsequent to time $t_3$, the subscriber may initiate another communications session (another voice call, in this example), at which point the charging system will begin accounting for this new communications session. At this juncture, the charging engine receives an authorization request, and as before, reserves the requested amount and grants the request (depicted in FIG. 1A as occurring at a time $t_4$). In so doing, the charging engine reserves a balance reservation 140. At a subsequent point in time during the communications session, additional balance may need to be reserved. Such a case is depicted as occurring at a time $t_5$, at which point, the charging system reserves and grants an additional amount of balance reservation (depicted in FIG. 1A as a balance reservation 142).

As can be seen in FIG. 1A, the total amount of balance potentially used in this scenario at time $t_5$ is the aggregation of committed balance 120, committed balance 134, balance reservation 140, and balance reservation 142, which, at least potentially, exceeds balance threshold 115. Unfortunately, while such an aggregation could exceed balance threshold 115, there is no way to determine definitively whether balance threshold 115 has been exceeded until the subscriber's communications session ends and the amount used are committed, because, in the posited scenario, the total balance ultimately used will depend on the amount of balance used by the subscriber's service usage with respect to balance reservation 140 and balance reservation 142. In the scenario posited in FIG. 1A, in fact, upon the communications session being closed (the voice call ended), just such a situation arises. As can be seen (at time $t_6$), a message indicating the end of the communications session is received that specifies the amount of balance reservations 140 and 142 used, amounts to a committed balance 144. When committed balance 144 is aggregated with committed balances 120 and 134, it can be seen that balance threshold 115 is exceeded. Only at this juncture can the subscriber be alerted to that fact, too late for the subscriber to address the situation.

Figure 1B:
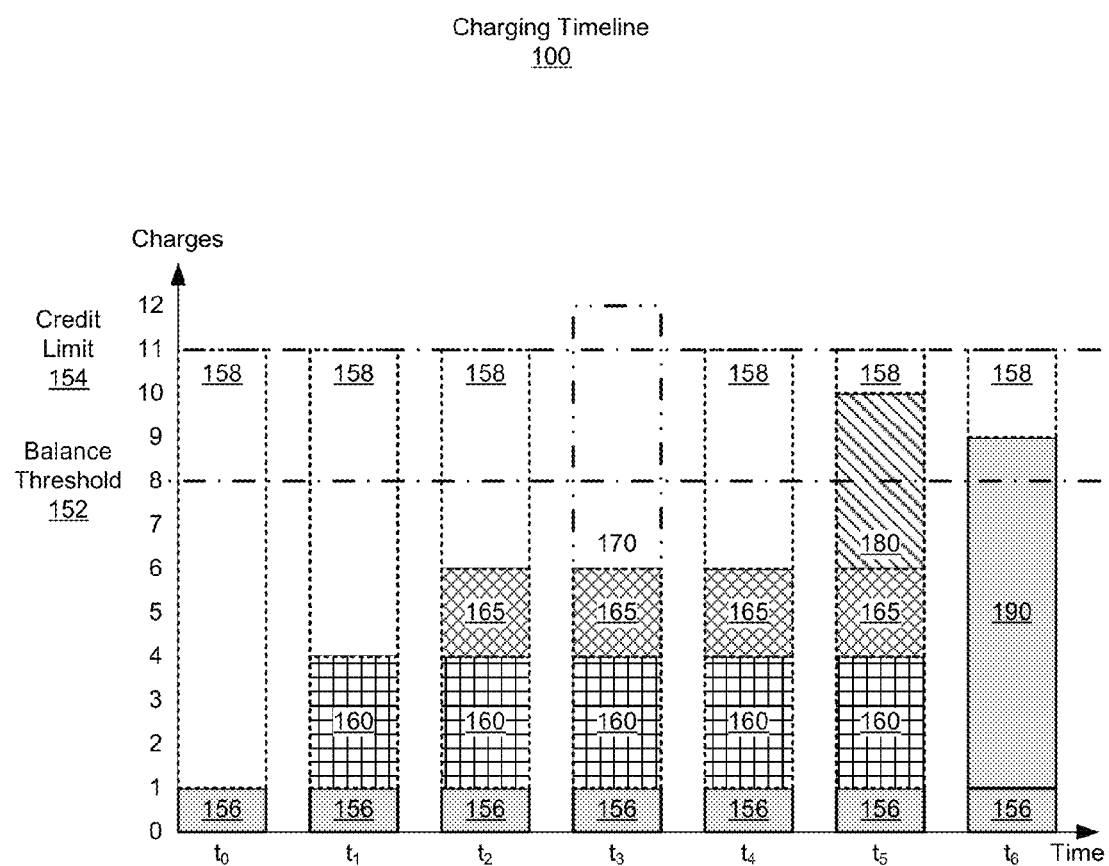
FIG. 1B is a simplified block diagram illustrating an example of another charging timeline.

FIG. 1B is a simplified block diagram illustrating another example of a charging timeline. In a fashion similar to that described in connection with FIG. 1A, FIG. 1B depicts a charging timeline 150 with time on its x-axis and charges on its y-axis. Also as before, charging timeline 150 indicates a credit limit 154 (in this case, 11 units), and a balance threshold 152 (in this case, 8 units). As before, the scenario depicted in FIG. 1B begins with an opening balance (depicted in FIG. 1B as a committed balance 156), and, in view of credit limit 154, an available balance (depicted in FIG. 1B as an available balance 158).

The scenario depicted in FIG. 1B begins, as before, and continues to a point at which a subscriber opens a session (e.g., by initiating a voice telephone call via cellular telephone) at a time $t_1$. At time $t_1$, the charging system receives a request for a balance reservation and, in response, reserves a balance reservation 160 and sends a response indicating that the requested balance reservation has been reserved. In the manner noted previously, as the session continues, additional balance reservations may be made. Thus, at time $t_2$, the charging system makes a second balance reservation (depicted in FIG. 1B as a balance reservation 165) and sends a message indicating that the reservation has been granted, in response to a request therefor.

The subscriber's communications session (e.g., cellular telephone call) proceeds in this fashion, with additional balance reservations being made as needed, within the constraints presented by the applicable limits (e.g., credit limit 154). An issue arises in this regard when a balance reservation should exceed such a limit. This sort of scenario is depicted in FIG. 1B at a time $t_3$, at which point an attempt is made to reserve a balance reservation that exceeds the applicable limit (in the scenario depicted in FIG. 1B, credit limit 154). This is depicted in FIG. 1B as an attempted balance reservation 170, which can be seen to exceed credit limit 154, when aggregated with opening balance 156, balance reservation 160, and balance reservation 165. That being the case, the charging system maintains available credit 158 at the same level as time $t_2$ (as depicted in charging timeline at a time $t_4$, shown primarily for purposes of this description). In view of such circumstances, the charging system may be forced to terminate the session (e.g. disconnect the cellular telephone call), or, alternatively, allow for a new attempt at a balance reservation, but, in either case, will send a response indicating that the request could not be granted (and so, is being denied). The latter scenario, in which a billing reservation 180 is successfully reserved by the charging system, is depicted as occurring as a time $t_5$, in response to a renewed request therefor. The charging system thus reserves a balance reservation 180 (reducing the available balance 158), and sends a message granting the (renewed) request. Subsequent to time $t_5$, the session closes (e.g., by way of the subscriber ending the telephone call), having not been terminated by the earlier failed reservation.

At this juncture, in the scenario depicted in FIG. 1B, the portion of balance reservations 160, 165, and 180 actually used during the communications session is now committed to the subscriber's balance as a committed balance 190 by the charging system (as well as associated business systems). Such a scenario gives rise to a number of issues, among them the subscriber not being alerted to balance threshold 152 having been exceeded, and the possibility that the earlier failed reservation was denied unnecessarily. In the former case, as before, the aggregate of opening balance 156, and committed balance 190 exceeds the threshold set by the subscriber (balance threshold 152), which can be problematic for the subscriber. In the latter case, if the portion of balance reservations 160 and 165 had been even 1 unit less than the sum total of their amounts (i.e., 4 units, instead of 5 units), attempted balance reservation 170 could have been successfully reserved, avoiding the additional communications overhead, time, and other resources involved in denying the original request. And this is to say nothing of such a denial resulting in the termination of a communications session—one can envisage the anger with which a subscriber would greet their telephone call suddenly ending, particularly in light of a later determination that the termination was, in fact, unnecessary.

Figure 2:
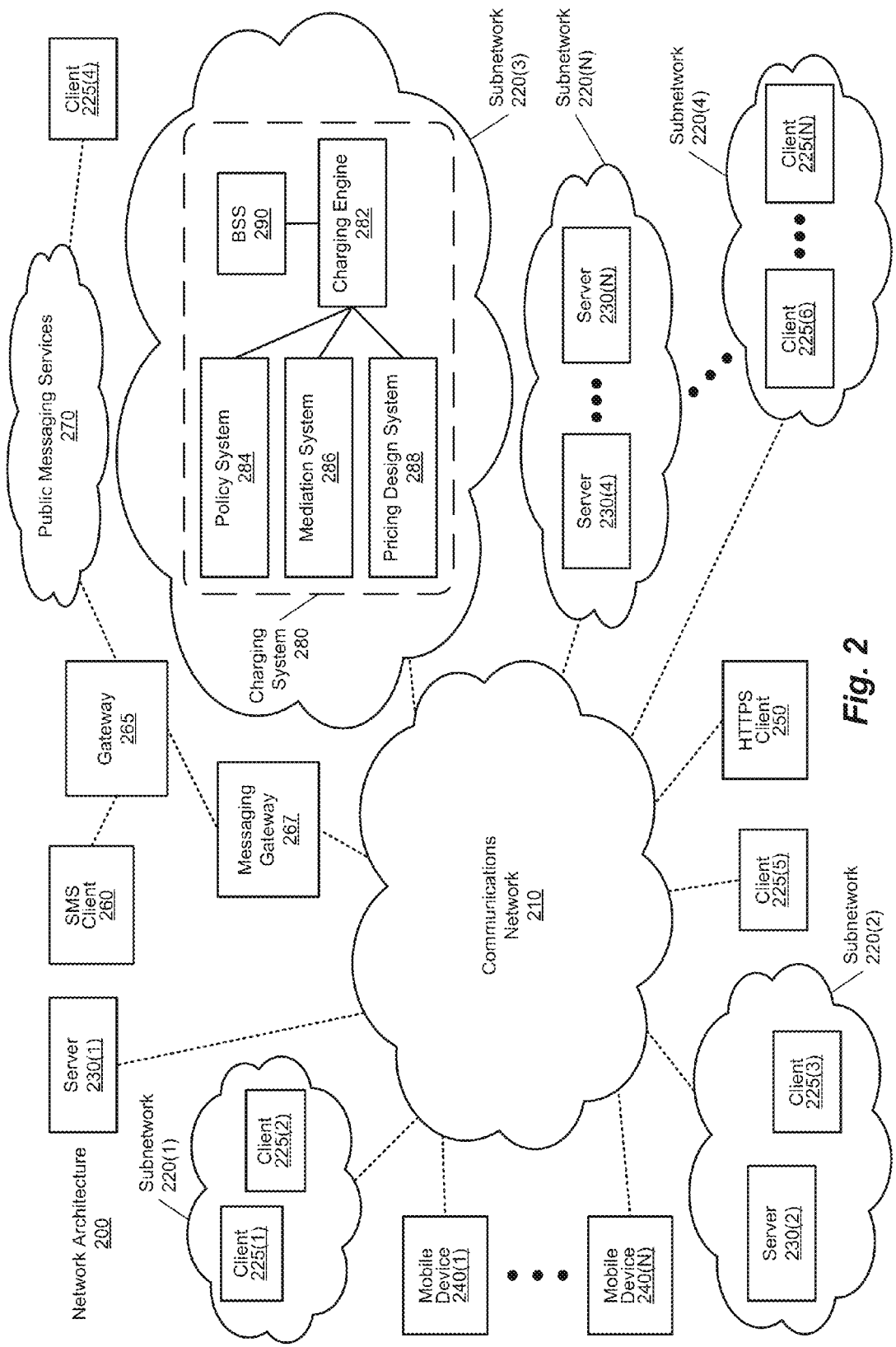
FIG. 2 is a simplified block diagram illustrating an example of a network architecture that includes a charging system according to embodiments of the methods and systems disclosed herein.

FIG. 2 is a simplified block diagram illustrating an example of a network architecture that includes a charging system according to embodiments of the methods and systems disclosed herein. Thus, FIG. 2 depicts a network architecture 200 as including a communications network (depicted in FIG. 2 as a communications network 210), which is configured to couple numerous of the elements of network architecture 200 to one another. In that regard (and among a number of such facilities provided thereby), communications network 210 supports communications between a number of subnetworks (depicted in FIG. 2 as subnetworks 220(1)-(N)). Subnetworks 220(1)-(N), in turn, can include a number of components, such as one or more clients (depicted in FIG. 2 as clients 225(1)-(N)) and/or servers (depicted in FIG. 2 as servers 230(1)-(N)). Clients 225(1)-(N) and/or servers 230(1)-(N) can, for example, be implemented using computer systems such as those described generically in connection with FIGS. 18 and 19. Communications network 210 thus communicatively couples subnetworks 220(1)-(N) to one another, thereby allowing clients 225(1)-(N) and servers 230(1)-(N) to communicate with one another (and can, in certain embodiments, provide for the servers of subnetworks 220(3) and 220(N), for example, to operate as cloud-based server systems). As is depicted in FIG. 2, clients 225(1)-(N) can be communicatively coupled to one another and to servers 230(1)-(N) as part of one of subnetworks 220(1)-(N), or directly via communications network 210. Similarly, servers 230(1)-(N) can be coupled via communications network 210 via a direct connection to communications network 210, or as part of one of subnetworks 220(1)-(N).

Network architecture 200 also provides for communication via communications network 210 using one or more other devices. Such devices can include, for example, a general packet radio service (GPRS) client 240 (e.g., a "smart phone," a "tablet" computer, or other such mobile device), a secure web client (e.g., a laptop computer running a secure hypertext transfer protocol (hypertext transfer protocol secure, or HTTPS), and depicted in FIG. 2 as an HTTPS client 250), and a basic cellular phone (e.g., using standard texting or other communication protocols, and depicted in FIG. 2 as a simple messaging service (SMS) client 260). Support for GPRS clients, SMS clients, HTTP clients, and the like thereby provide users with communication functionality according to an embodiment in a mobile environment. SMS client 260 can communicate via communications network 210 via several channels. SMS client 260 can communicate directly, for example, with a gateway 265, which, in turn, communicates with communications network 210 via a messaging gateway 267 and, optionally, elements within subnetwork 220(3), for example. Alternatively, SMS client 260 can, via gateway 265, communicate with subnetwork 220(3) (and so, communications network 210) via public messaging services 270 to which gateway 265 and subnetwork 220(3) are connected. As is also depicted in FIG. 2, a client 225(4) is also able to communicate via communications network 210 by way of public communication services 270 and subnetwork 220(3).

In order to support the aforementioned communications, as well as other communications within network architecture 200 according to various embodiments, subnetwork 220(3) includes a charging system 280, as well as (optionally) providing for a number of clients and/or other servers (not shown), in the manner of subnetworks 220(1)-(N). Charging system 280 supports communications within network architecture 200 by way of receiving usage information from and providing control information to the elements of network architecture 200, maintaining usage information, and performing other such functions. Such usage information can include, for example, accounting information, service usage, and other relevant information, as may relate to voice telephone calls, data transfers, messaging, and other such communications, as may occur between various of the elements of network architecture 200.

Charging system 280 includes a number of elements in support of these functions. Such elements include a charging engine 282, which is central to the functionality provided by charging system 280. Charging engine 282 provides information to and receives information from other elements of charging system 280, which can include, for example, a policy system 284, a mediation system 286, a pricing design system 288, and business support systems (BSS) 290. In so doing, charging engine 282 provides support for functions provided by policy system 284, mediation system 286, pricing design system 288, and BSS 290. The functionality provided by charging engine 282, policy system 284, mediation system 286, pricing design system 288, and BSS 290 are described in further detail subsequently herein.

Briefly, policy system 284 includes functionality that comprehends the design of policies to control operational aspects of charging system 280 by defining and enforcing (via, e.g., charging engine 282 and other elements of charging system 280) policies and rules resulting therefrom on the users of services provided via communications network 210 and other elements of network architecture 200. Similarly, pricing design system 288 can be used to design and implement pricing structures for the services provided within network architecture 200 by a service provider, allowing such a service provider to achieve fair pricing for their services, while helping to maintaining the profitability of those services. Business support systems 290 interact with charging engine 282 in order to allow the service provider to generate invoices, control access to the network, access other elements of charging system 280, and the like, as well as open, maintain, and close subscriber accounts as needed.

Mediation system 286 interacts with charging engine 282 in order to provide functionality related to controlling certain aspects of the provision of services throughout network architecture 200. Thus, in one embodiment mediation system 286 receives charging events from elements of network architecture 200, extracts event attributes, and generates a usage request. Mediation system 286 then submits the usage request to charging engine 282, which makes the requisite determinations and sends a usage response, indicating the outcome(s) of those determinations (e.g., granting or denying the usage request), to mediation system 286. Mediation system 286, in turn, interacts with various elements of network architecture 200 to effect the outcome(s) indicated by charging engine 282.

As will be appreciated in light of the present disclosure, a service provider such as that described herein (e.g., a telecommunication service provider, a shipping service provider, a utility service provider, and the like) provides subscribers with access to one or more service products. A service provider can implement a charging system that is configured to define and enforce conditions indicating how subscribers should be charged for service usage. Service providers strive to provide a quality service experience to subscribers. Service providers can measure the quality of a service by measuring various objective aspects of the service, such as by monitoring certain performance indicators that reflect the quality of the provided service. Example performance indicators in a telecommunications systems such as network architecture 200 include bandwidth (e.g., maximum rate of information transferred), throughput (e.g., actual rate of information transferred), latency (e.g., time measured between sending a subscriber's request and receiving a response), jitter (e.g., variation in arrival time of information), and error rate (e.g., number of corrupted bits as a percentage of total bits sent). Service providers often assure subscribers of a quality user experience by specifying ranges or limits of a number of performance indicators in a service level agreement (SLA), where the performance indicators define a minimum guaranteed level of quality for the provided service.

It will be appreciated that, in light of the present disclosure, the variable identifier "N" is used in several instances in various of the figures herein to more simply designate the final element of a series of related or similar elements (e.g., subnetworks 220(1)-(N), clients 225(1)-(N), and servers 230(1)-(N)). The repeated use of such variable identifiers is not meant to imply a correlation between the sizes of such series of elements. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

As will be appreciated in light of the present disclosure, processes according to concepts embodied by systems such as those described herein include one or more operations, which may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Figure 3:
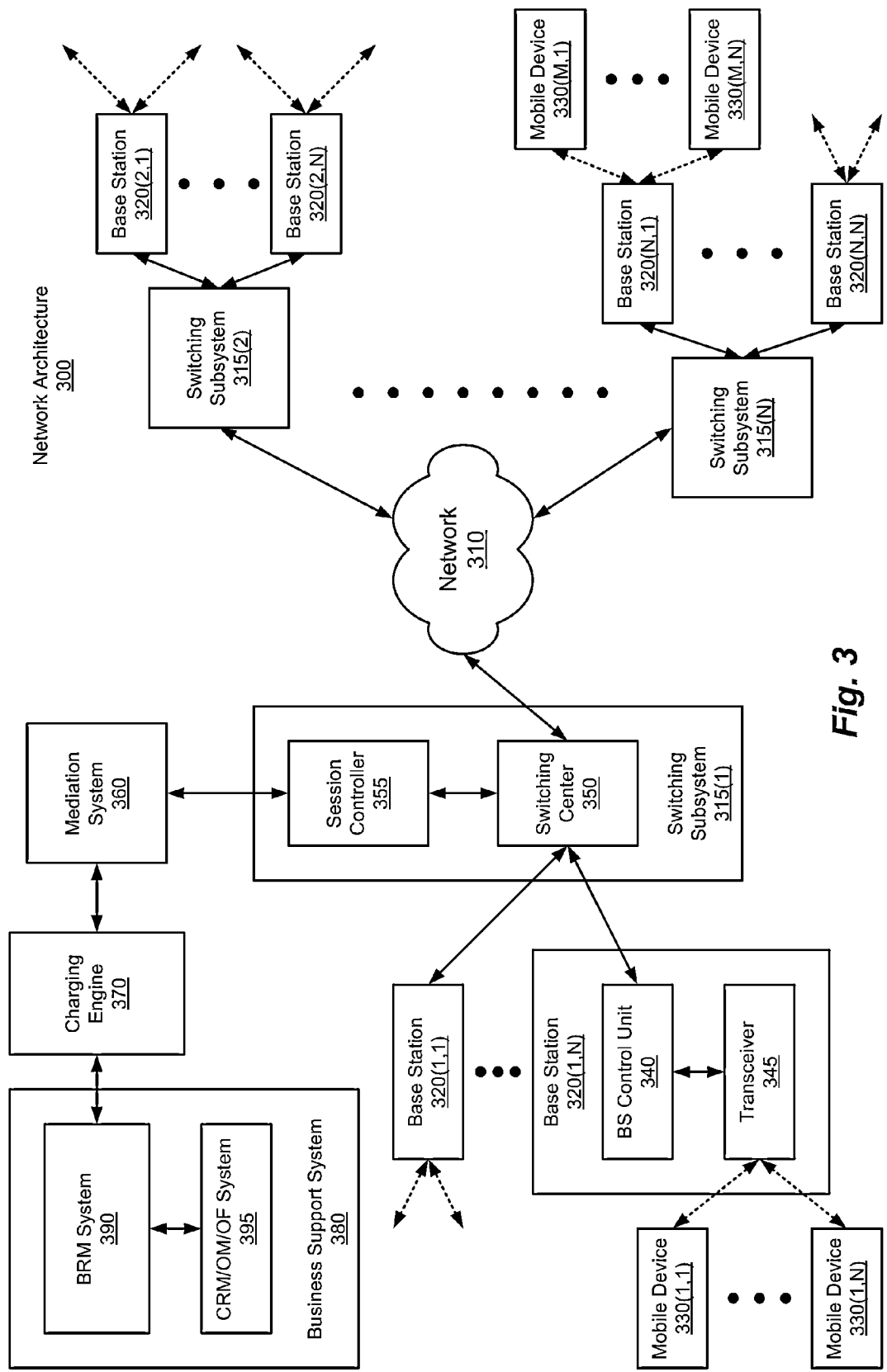
FIG. 3 is a simplified block diagram illustrating an example of a network architecture, according to embodiments of the methods and systems disclosed herein.

FIG. 3 is a simplified block diagram illustrating an example of network architecture, according to embodiments of the methods and systems disclosed herein. A network architecture 300 such as that depicted in FIG. 3 can include a number of systems and subsystems, some of which are comparable to those depicted in network architecture 200. For example, network architecture 300 includes a network 310, which communicatively couples a number of switching subsystems (depicted in FIG. 3 as switching subsystems 315(1)-(N)) to one another. Switching subsystems 315(1)-(N) couple a number of base stations (depicted in FIG. 3 as base stations 320(1,1)-(N,N)) to one another via network 310. In turn, base stations 320(1,1)-(N,N) provide a number of mobile devices (depicted in FIG. 3 as mobile devices 330(1,1)-(M, N)) with access to the communications facilities of network architecture 300. Such communications facilities can, for example, be provided in the manner of various ones of mobile devices 240(1)-(N), SMS client 260, clients 225(1)-(N), and other such elements of FIG. 2.

In the example depicted in FIG. 3, base stations 320(1,1)-(N,N) provide access between ones of mobile devices 330(1,1)-(M,N) using, for example, radio frequency communications. That being the case, base station 320(1,N) is depicted as including a base station control unit 340 and a transceiver 345. As can be seen in FIG. 3, transceiver 345 supports wireless communications with mobile devices 330(1,1)-(1,N), and provides these mobile devices with access to other such mobile devices on the network (e.g., via switching subsystem 315(1) and network 310). Base station control units such as base station control unit 340 handle connections (e.g., voice, data, messaging, and other such communications) between various ones of mobile devices 330(1,1)-(1,N), as well as to other elements of network architecture 300. For example, in a wireless (e.g., cellular) telephone system, the signals from one or more mobile telephones in a given area (typically referred to as a cell) are received at a base station such as base station 320(1,N), which then connects the call to other elements of network architecture 300. In such a case, elements of network 310 can include carrier, microwave radio, and/or switching facilities that connect calls from various ones of mobile devices 330(1,1)-(M,N) to various others of mobile devices 330(1,1)-(M,N).

Next, such a connection transits a switching center such as switching center 350 of switching subsystem 315(1). Switching center 350 performs functions such as switching incoming and outgoing voice and data connections, as well as interacting with a session controller 355 of switching subsystem 315(1), in order to support communications (e.g., voice calls) and tracking of such activity for purposes of billing and the like. To this end, session controller 355, as its name implies, controls communications sessions transiting switching centers such as switching center 350, and supports tracking of communications sessions for billing purposes (e.g., charging), communications session monitoring, voice and data traffic management, failure detection and recovery, and other such functions.

Switching subsystem 315(1), via session controller 355, communicates with a mediation system 360. Mediation system 360, depicted in FIG. 3 as an online mediation system, provides functionality related to the conversion of data of certain data types to other data types, typically for billing purposes, and can be implemented using one or more servers (a server, in turn, being implemented using one or more computing devices). A mediation system such as mediation system 360, among other functions, processes usage detail records (more specifically, call detail records (CDRs)) and handle information regarding voice and data calls such as call duration, peak time information, and the like.

Mediation system 360 is communicatively coupled to both one or more session controllers such as session controller 355, and a charging engine 370 (described subsequently). When a subscriber wishes to utilize a service, the subscriber's device (e.g., one of mobile devices 330(1,1)-(1,N)) attempts to make a connection, resulting in a request for the service (a service request) being sent to mediation system 360. Mediation system 360 processes call detail records and other such information received from session controller 355. A message processing service module within mediation system 360 generates a corresponding usage request and routes the usage request to the appropriate charging component of charging engine 370. Such a charging request includes a payload that contains information (e.g., from the relevant CDR(s)) in the form of attributes about the subscriber's service usage, such as the type of service being utilized and service usage measurements (e.g., volume-, time-, or event-based service usage measurements), and can be implemented using one or more servers, as well. In response, charging engine 370 utilizes the payload to perform the appropriate operations (e.g., charging the subscriber, performing authorization operations, and/or the like). Charging engine 370, which can perform charging functions for both offline and online charging, receives and operates on the information received from mediation system 360. Charging engine 370 then responds to the service request received from mediation system 360 with a response (a usage response) that indicates, for example, whether the service request is granted or denied.

In certain embodiments, charging engine 370 also provides information regarding communications sessions to a business support system (BSS) 380. BSS 380, in turn, includes a billing and revenue management (BRM) system 390 and a customer relationship management (CRM)/order management/order fulfillment system 395. Thus, in addition to maintaining information about and performing calculations regarding subscriber's use of services within network architecture 300, charging engine 370 provides communication providers with the ability to not only track usage of their network, but also control such usage. Thus, charging engine 370 provides business support system 380 with information regarding, for example, call detail records, for purposes of billing, accounting, and the like. As will be apparent in light of the present disclosure, billing and revenue management system 390 uses this information to generate information to subscribers, provide subscribers with information as to their accounts, and other such client-facing functions. Access to billing and revenue management system 390 can be had via CRM/ON/OF system 395, which provides a variety of functions relevant to the provision of services to subscribers, as well as subscriber access to accounts (e.g., via the web, or the like).

For service providers that provide subscribers with communications services using network architectures such as network architecture 300, latency in processing communications transactions is unacceptable because service quality is dependent upon the speed with which a service transaction (or an exchange of a usage request message and a usage response message) is completed, such as a service that cannot be provided to a subscriber until the subscriber or particular service usage (e.g., an event) is authorized by a charging engine. For example, a subscriber may not be able to make a cellular telephone call under a pre-paid service plan until the charging engine verifies that the subscriber has enough credit to initiate the call. In such a charging system, a service provider may define a performance goal of a maximum service transaction latency time of 50 milliseconds in the charging system, where latency of a service transaction is measured from the time a service request is sent to the charging engine from the mediation system until the time a corresponding service response is received at the mediation system from the charging engine.

And as the volume of communications sessions increases, the demands placed on such systems only increases, causing delays to lengthen and throughput levels to fall. Further, as the number of subscribers increases, the number of service transactions that need to be processed by the charging engine also increases, which in turn requires additional (and expensive) computing resources to monitor the latency of those service transactions. As a result, processing latencies increase exponentially, as the number of subscribers (and so service transactions) grew. For example, with 10 subscribers executing 10 service transactions each, 100 total service transactions would need to be processed. With 10 times that number of subscribers (100 subscribers) and service transactions (100 per subscriber), the total number of service transactions balloons to 10,000. As will be appreciated, then, subscriber experience must remain a focus when designing such systems.

Further, not only is subscriber experience impacted by the speed with which such transactions are processed, but such communications are typically held to requirements set out in any number of applicable standards. The problems caused by the aforementioned exponential growth are only compounded when the need to service such transactions quickly to meet the requirements of standards is taken into account. For example, the relevant time constraints for certain communications sessions are often spelled out in widely-promulgated international standards, such as the 50 ms, 230 ms, and 2 s constraints mandated to avoid Carrier Group Alarms (CGAs) in the case of voice telephone calls adhering to various relevant standards (e.g., including, but not limited to, 3GPP™ IMS (and more particularly, 3GPP™ (Phases 1 and 2, and Releases 96-99 and 4-11)), Bell Communications Research (Bellcore; now Telcordia) General Requirements and Industry Standards (GR) GR-499, Bellcore GR-253 (including GR-253: Synchronous Optical Network (SONET) Transport Systems, Common Generic Criteria, Issue 5 [Bellcore, October 2009]), and ANSI (American National Standards Institute) T1.102, and the timing requirements therein, all of which are included herein by reference, in their entirety and for all purposes). If such increases in load are not addressed by the techniques employed, the processing overhead incurred while processing an ever-greater number of service transactions will slow the charging engine's processing of those service transactions, lengthening latency times and reducing throughput. Thus, in the case of time-critical services (e.g., voice telephone communications), the number of subscribers and service requests, along with the requirements of the relevant standards, quickly results in situations that become unworkable. These and other limitations and problems are addressed by systems according to the present disclosure.

To this end, the computing devices used to implement the servers noted elsewhere herein are therefore typically robust and computationally powerful. By employing high-performance computing platforms, such servers maximize throughput, and enable the provision of services quickly and efficiently. To this end, these server systems can be implemented using designs that are built for high-performance, in-memory operations. For example, such a server system can be designed to store multiple terabytes of data directly in memory, thereby providing for fast processing of data and communications based thereon, resulting in responsive performance that meets the timing requirements of the applicable technical standards. In one embodiment, such a server system supports high-speed main memory of 1 Terabyte (or more, depending on the element's needs) and 2.4 TB of high-speed second-tier memory (e.g., FLASH memory or the like) that can support hundreds of thousands of input/output operations per second, as well as bandwidth at the multi-gigabytes level. These memory layers are further backed by of hard disk storage (3.6 TBs or more), which is expandable (e.g., using Fibre Channel and other such high-speed technologies). Computationally, such a server system can include a processing package of 40 compute cores with hyper-threading. A generic example of such components is provided in connection with the discussion of FIGS. 18 and 19, below.

Figure 4:
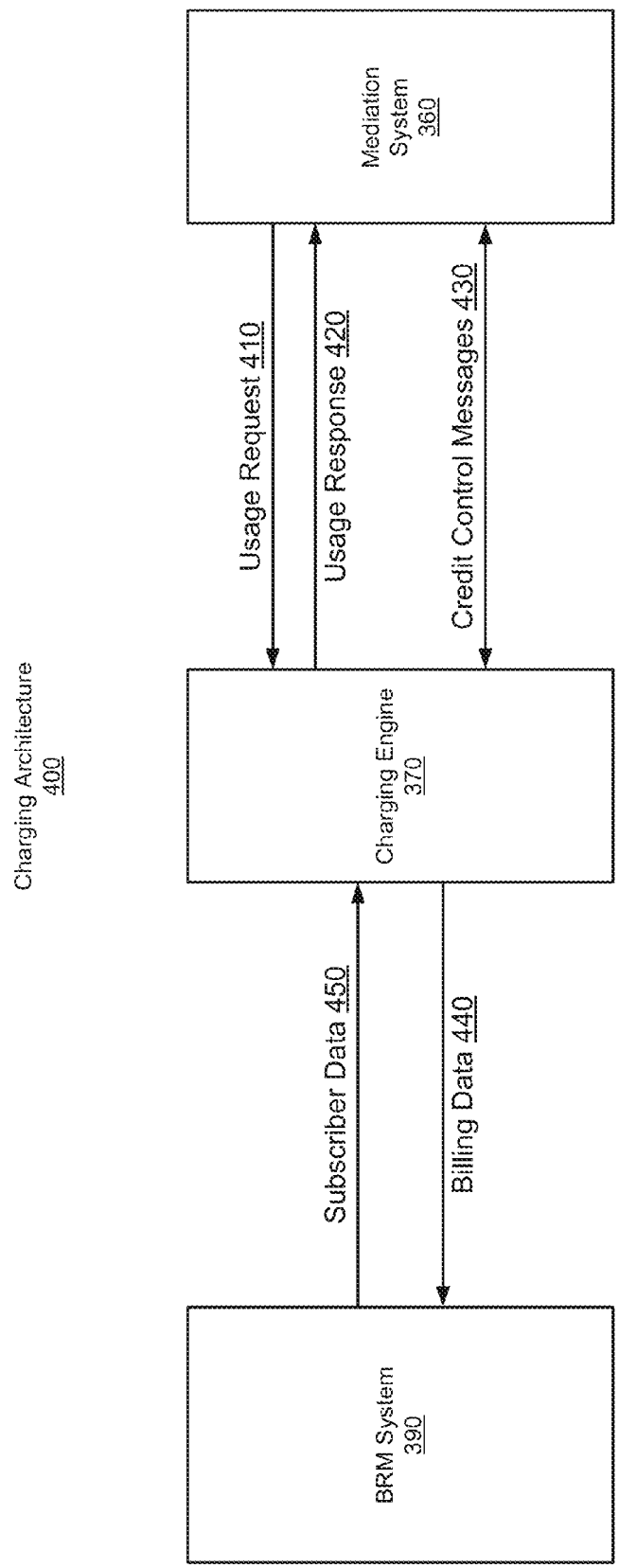
FIG. 4 is a simplified block diagram illustrating an example of a charging architecture, according to embodiments of the methods and systems disclosed herein.

FIG. 4 is a simplified block diagram illustrating an example of a charging architecture, according to embodiments of the methods and systems disclosed herein. To this end, FIG. 4 depicts a charging architecture 400 in which mediation system 360, charging engine 370, and billing and revenue management system 390 of FIG. 3 appear. In a manner comparable to that discussed briefly with regard to FIG. 3, charging engine 370 acts as a central element of charging architecture 400, as well as network architecture 300. Various of the communications between these elements are now described in connection with charging architecture 400.

In this regard, mediation system 360, having received a request from, for example, session controller 355, sends a usage request to charging engine 370 (depicted in FIG. 4 as a usage request 410). As noted elsewhere, mediation system 360 can be implemented using one or more servers, such as those described above, and can be communicatively coupled to charging engine 370 and the relevant elements of the given network architecture (e.g., session controller 355) by way of an appropriate communications protocol (e.g., one or more IP (Internet Protocol) networks that utilize a communications protocol such as Ethernet, IEEE 802.11x, or some other communications protocol). The charging request received can include, for example, a payload that contains information in the form of attributes about the subscriber's service usage, such as the type of service being utilized and service usage measurements (e.g., volume-, time-, or event-based service usage measurements). Charging engine 370 and BRM system 390 are configured to utilize the payload to charge the subscriber or perform other authorization operations.

Charging engine 370 receives usage request 410 and makes certain determinations in relation thereto, and then provides mediation system 360 with a usage response 420. For example, mediation system 360 may send a usage request 410 to charging engine 370, indicating that a subscriber has initiated a voice telephone call and requesting that charging engine 370 grant a balance reservation in support of the request made on behalf of the subscriber's desired communication session.

As noted, charging engine 370 is configured to perform operations that determine (or allowed to be determined) charges that arise from a subscriber's service usage. Charging engine 370 can be implemented on one or more processing nodes, where the one or more processing nodes are implemented on one or more servers (such as on a grid-based high-availability cluster of servers, such as described earlier), and implemented on one or more computing devices. Charging engine 370 includes one or more charging components, each of which is responsible for performing a portion of the determinations needed to appropriately charge the subscriber for service usage. The charging components of charging engine 370 can be implemented on the one or more processing nodes of charging engine 370.

In turn, charging engine 370 responds with usage response 420 (e.g., granting the subscriber's communication session a balance reservation), thereby allowing the voice call to proceed. In addition, mediation system 360 and charging engine 370 may exchange credit control messages 430. Such credit control messages can include indications as to the need to terminate a session due to insufficient credit, information regarding the support of multiple services, origin- and destination-related information, and other such information. Charging engine 370 also communicates with billing and revenue management system 390, by, for example, providing billing data (depicted in FIG. 4 as billing data 440), while billing and revenue management system 390 can provide information regarding subscribers (depicted in FIG. 4 as subscriber data 450) to charging engine 370.

Figure 5:
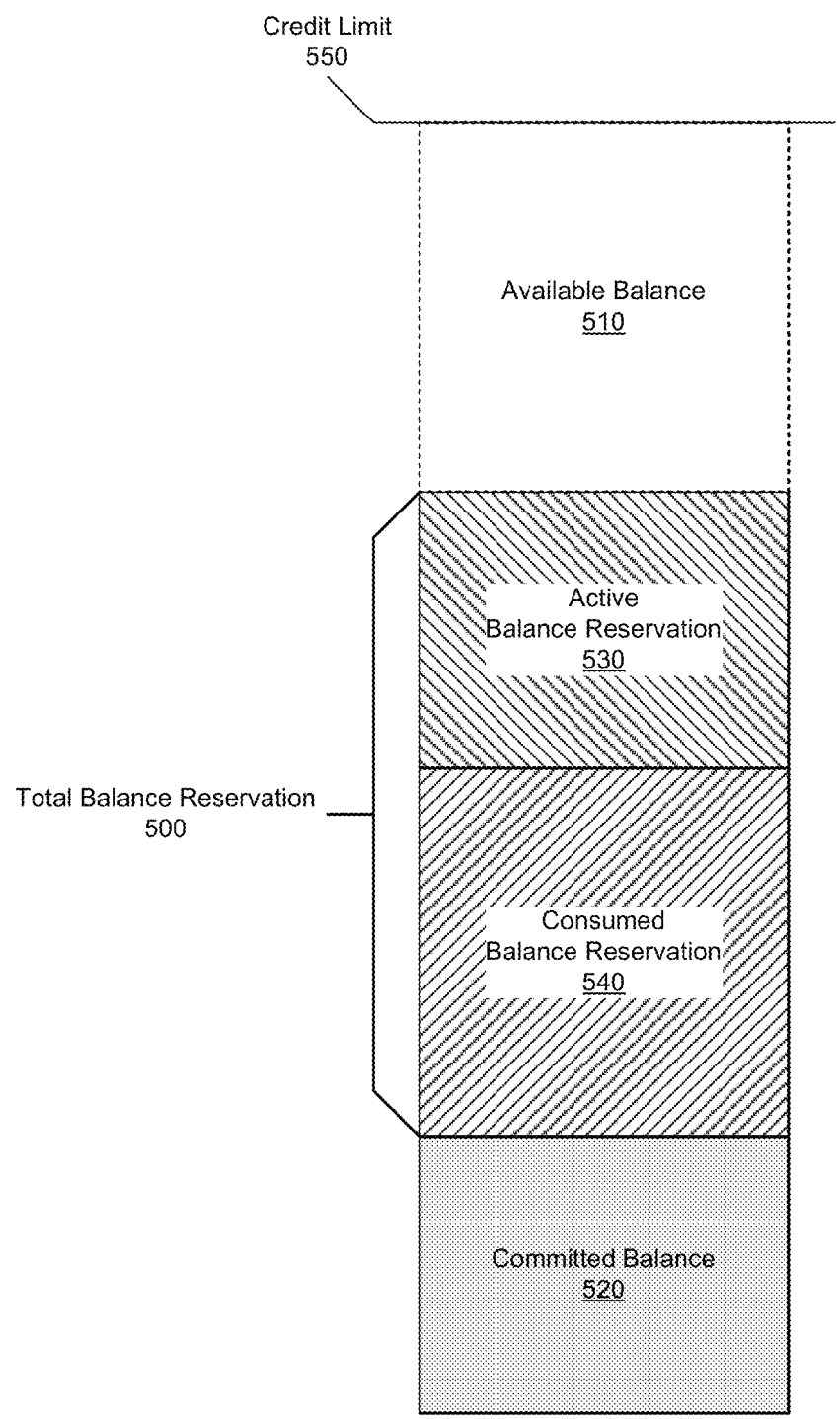
FIG. 5 is a simplified block diagram illustrating an example of active and consumed balance reservations, according to embodiments of the methods and systems disclosed herein.

FIG. 5 is a simplified block diagram illustrating an example of active and consumed balance reservations, according to embodiments of the methods and systems disclosed herein. According to such methods and systems, the concept of a consumed balance reservation is employed to allow for a more accurate, more timely determination of the charges pending against a subscriber's account. By providing features and mechanisms that support the communication and processing of such information, subscribers can be provided with a more accurate view of their current balance usage. To this end, then, FIG. 5 depicts a total balance reservation 500, an available balance 510, and a committed balance 520. In the scenario shown in FIG. 5, total balance reservation 500 includes an active balance reservation 530 and a consumed balance reservation 540. As will be appreciated, an available balance such as available balance 540, as used herein, is the difference between the aggregation of total balance reservation 500 and committed balance 520, and a credit limit 550. A committed balance such as committed balance 520, in certain embodiments, represents the previous amounts of subscriber balance used in one or more preceding communications sessions, which has been committed to the accounting system tasked with aggregating and maintaining such information.

As is described in further detail elsewhere herein, active balance reservation 530 and consumed balance reservation 540 allow a subscriber's account balance(s) to be monitored in a variety of ways. For example, by providing mechanisms such as those described herein, information regarding the consumed portion of total balance reservation 500 (consumed balance reservation 540) can be used to more closely track a subscriber's service usage by making available information regarding a subscriber's service usage earlier in the process of accounting therefor, and so allow that information to be employed in more useful and meaningful ways. Thus, consumed balance reservation 540 represents that amount of account balance (e.g., of one or more previous active balance reservations) actually having been consumed during the communications session for which such (active) balance reservations were made. By contrast, active balance reservation 530 represents that amount of account balance that has been reserved (e.g., in response to a usage request), in certain embodiments. However, at a point in time subsequent to that represented in FIG. 5, some portion (or all) of active balance reservation 530 will have been consumed, in a manner comparable to the process that gave rise to total balance reservation 500 (though, as depicted in FIG. 5, only committed balance 540 has been committed at the point in time depicted therein). At that subsequent point in time, a message received (e.g., by the given charging engine) can be used to determine (e.g., by an indication therein) the amount of active balance reservation 530 that was consumed by the communications session in question. The amount of active balance reservation 530 thus consumed becomes the next consumed balance reservation, with the unused balance reservation remaining being "returned" to available balance 510. As will be discussed in further detail subsequently, such a process proceeds until, for example, the communications session ends, at which point the consumed reservation balances are committed.

Figure 6:
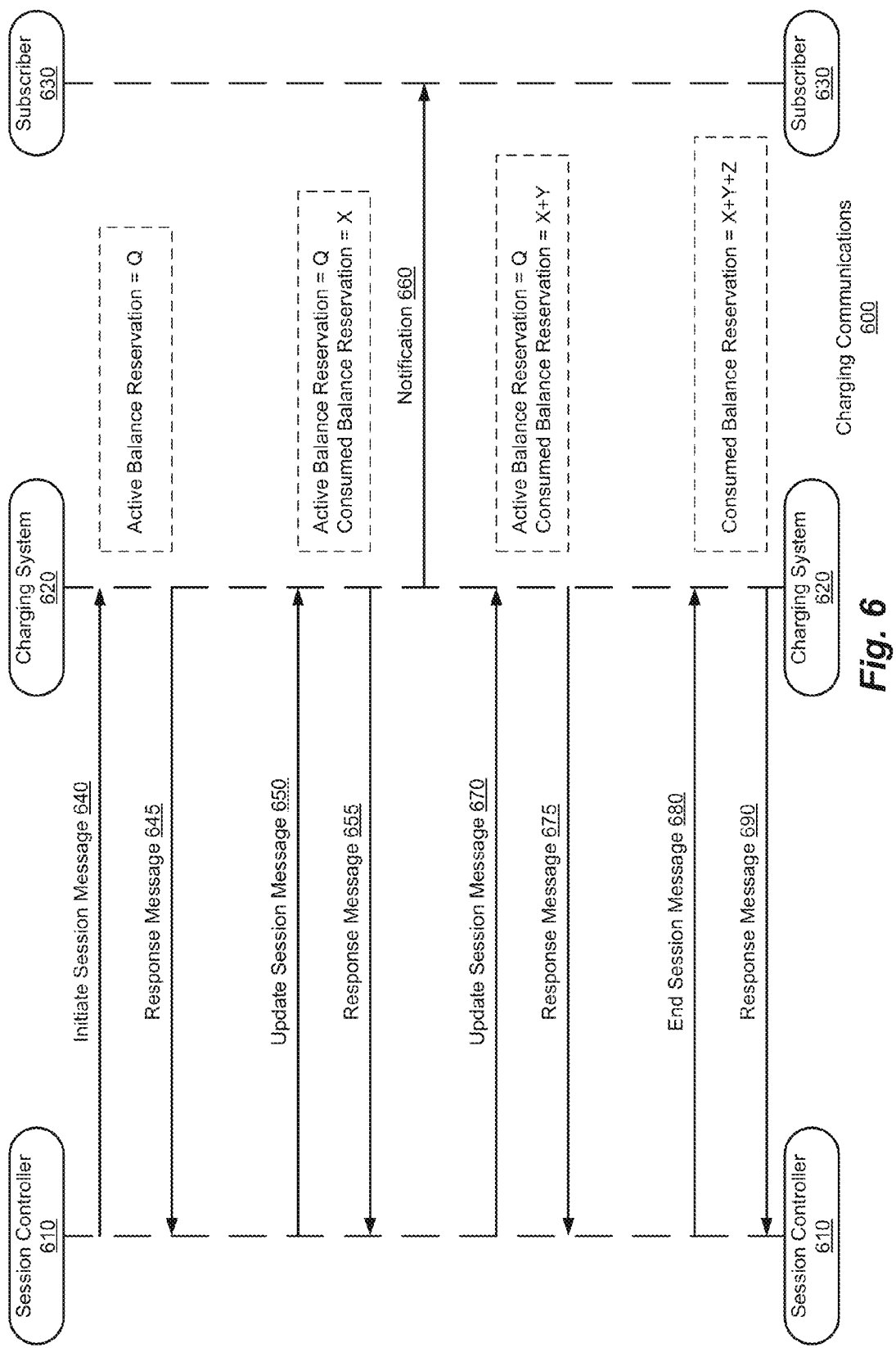
FIG. 6 is a simplified block diagram illustrating an example of a set of charging communications, according to embodiments of the methods and systems disclosed herein.

FIG. 6 is a simplified block diagram illustrating an example of a set of charging communications, according to embodiments of the methods and systems disclosed herein. The set of charging communications depicted in FIG. 6 (charging communications 600) can be understood with reference to the elements or charging architecture 400, as depicted in FIG. 4, and network architecture 300, as depicted in FIG. 3. In this regard, charging communications 600 occur between a session controller 610, a charging system 620, and a subscriber 630. As will be appreciated in view of network architectures 300 and 400, among other such figures herein, the charging communications depicted as charging communications 600 occur between the various elements thereof.

Charging communications 600 begin with an initiate session message 640, from session controller 610 to charging system 620. Receipt of initiate session message 640 by a charging system 620 results in the reservation of an active balance reservation in an amount Q. Charging system 620 responds to session controller 610 by sending session controller 610 a response message 645, indicating that the active balance reservation of Q has been reserved and granted to subscriber 630. Subsequently, at a later time, for example, session controller 610 sends an update session message 650 to charging system 620. Such might be the case, for example, in the situation in which a voice call is ongoing. Thus, session controller 610, on behalf of subscriber 630, requests additional active balance reservation as the communications session proceeds. Update session message 650 indicates to charging system 620 that the communications session is ongoing, and that and additional balance reservation is needed. Update session message 650 also includes information indicating that, of the last active balance reservation (in the amount of Q), only a quantity of X was consumed. This is recorded as a consumed balance reservation in the amount of X. In response, charging system 620 sends a response message 655 to session controller 610, granting the communications session an active balance reservation in the amount of Q.

Additionally, in the scenario in which the committed balance of subscriber 630, in combination with the consumption of a consumed balance reservation in the amount of X, exceeds a threshold set by the subscriber 630, a notification 660 can be sent to subscriber 630, alerting subscriber 630 to the communications session's having exceeded that threshold. As discussed subsequently, various embodiments' use of balance thresholds can be based on consumed balance reservations alone, or can include consideration of active balance reservations, as well. Such thresholds can be configured by the user, by the service provider (e.g., for internal use, to set defaults for a subscriber when configuring the subscriber's account, or the like), or by others interacting with the given charging system. This allows subscriber 630 to better manage their use of the communication network, and allows service providers such as those servicing the account of subscriber 630 to provide services (and charges therefor) that are in line with the expectations with their subscribers. Using such an approach, subscriber 630 can, in fact, set multiple such thresholds, providing an even finer granularity of control over the subscriber's use of their account (and so, improving the user experience provided by the service provider).

At some later time, session controller 610 sends yet another request to charging system 620 in the form of an update message 670, which requests a further balance reservation (in the form of another active balance reservation) in the amount of Q, and also indicates that the communications session initiated by subscriber 630 has now consumed an additional amount of balance, in the amount of Y. Such consumption is reflected in FIG. 6 by consumed balance reservation being equal to a total of (X+Y). In response to update session message 670 and the request for an active balance reservation of Q, charging system 620 responds with a response message 675, granting the communications session managed by session controller 610 an additional active balance reservation in the amount of Q. As will be appreciated in light of the present disclosure, the active balance reservations of FIG. 6 compare to active balance reservation 530 of FIG. 5, while the consumed balance reservations FIG. 6 compare to consumed balance reservation 540 of FIG. 5. As will be further appreciated, such requests for further balance reservations can, in the alternative, be denied (e.g., if such a request would exceed a credit limit such as credit limit 550 (though certain embodiments can address such situations differently)).

Sometime later in charging communications 600, session controller 610 sends an end session message 680, which indicates the end of the communications session, and also provides the amount of the last active balance reservation that was consumed (a consumed balance reservation of Z), bringing the consumed balance reservation to a total of (X+Y+Z). Charging system 620 acknowledges receipt of this information in a response message 690.

As will be appreciated in light of the foregoing, the active balance reservations (and thus, the consumed balance reservations) can be tracked throughout a communications session, for different sessions, services, and so on. For example, update session messages and response messages can be communicated with regard to any number of different services, for example, including voice services, data services, messaging services, and the like. Further, using a mechanism such as that depicted in FIG. 6 and discussed elsewhere herein, a subscriber such as subscriber 630 can, in fact, define a number of thresholds, in a variety of ways. In this regard, a subscriber can define multiple thresholds for a given means of communication (e.g., voice calls, data transfer, messaging, and the like), and/or can define different thresholds for these various types of communications. Further still, it will be appreciated that, in light of the present disclosure, such operations can be carried out with regard to any number of services, sessions for which can occur sequentially or in parallel, as well as combinations thereof.

Figure 13A:
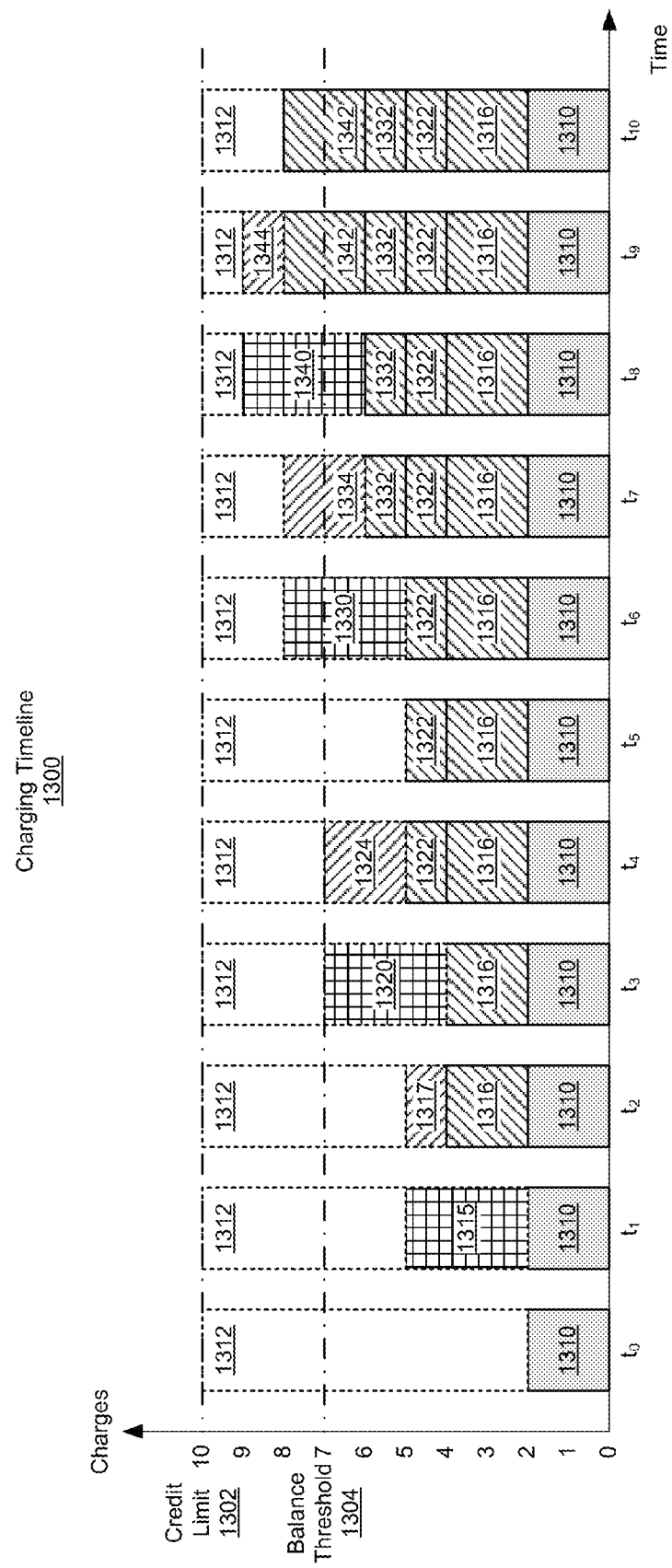
FIG. 13A is a simplified block diagram illustrating an example of a charging timeline, according to embodiments of the methods and systems disclosed herein.

It will also be noted that the scenario presented with respect to FIG. 6 is comparable to that depicted in FIG. 13A.

Figure 7:
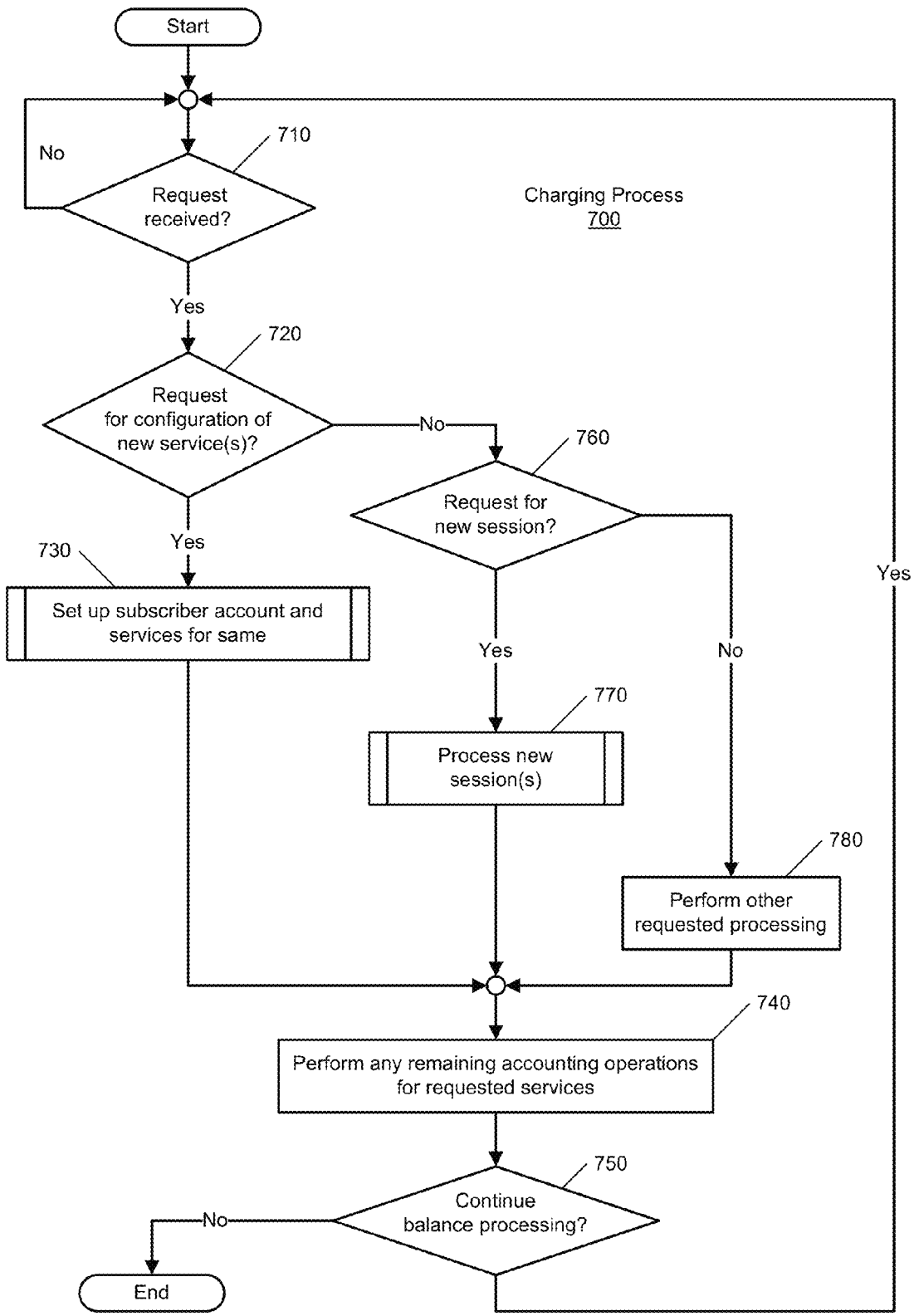
FIG. 7 is a simplified flow diagram illustrating an example of a charging process, according to embodiments of the methods and systems disclosed herein.

FIG. 7 is a simplified flow diagram illustrating an example of a charging process, according to embodiments of the methods and systems disclosed herein. The process of FIG. 7 (referred to as a charging process 700) can be performed, for example, in a charging architecture such as network architecture 300, or charging architecture 400, and is discussed in terms of the elements depicted therein, as examples. Charging process 700 begins with a determination as to whether a request has been received (step 710). As depicted in FIG. 7, the process loops, awaiting receipt of a request.

Upon the receipt of a request, a determination is made as to whether the request is a request for the configuration of one or more new services (step 720). If the request received indicates that a subscriber wishes to establish one or more new services, charging process 700 proceeds to set up the subscriber's account and services for the account, in accordance with the request (step 730). Such requests can be handled via the components of a business support system such as BSS 380, for example. The process of setting up a subscriber's account and the operations associated therewith are described in further detail in connection with FIG. 8, below.

Charging process 700 then performs any other accounting operations needed to complete processing of the requested services (step 740). After such operations, a determination is made as to whether balance processing is to be continued (step 750). If further balance processing operations are to be performed, charging process 700 returns to awaiting receipt of the next request (step 710). Alternatively, if no further balance processing is to be performed (step 750), charging process 700 concludes.

In the case in which the request received is for a balance processing operation other than establishing new services (step 720), charging process 700 proceeds to a determination as to whether the request received is for a new communications session (step 760). If the request received is for a new communications session, the new communications session is processed (step 770). As before, once one or more new communications sessions have been processed, any remaining accounting operations related to the requested services are performed (step 740). Also as before, a determination is made as to whether balance processing operations are to continue (step 750), resulting in charging process 700 either looping to await the next request (step 710) or concluding.

If the request received is for neither the configuration of new services or for a new session, any other requested processing is performed (step 780). As before, charging process 700 then continues to perform any remaining accounting operations related to the requested services (step 740), and makes a determination as to whether balance processing operations are to be continued (step 750). If balance processing operations are to continue, charging process 700 loops to await receipt of the next request (step 710), or concludes, as appropriate.

Each of the operations of charging process 700 may be executed by a module (e.g., a software module) or a portion of a module or a computer system user using, for example, one or more servers such as those described elsewhere herein. Thus, the above described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module, for example.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable storage media. The computer readable storage media may be permanently, removably or remotely coupled to the computer system. The computer readable storage media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits; volatile storage media including registers, buffers or caches, main memory, RAM, and the like; and other such computer-readable storage media. In a UNIX-based embodiment, the software modules may be embodied in a file which may be a device, a terminal, a local or remote file, or other such devices. Other new and various types of computer-readable storage media may be used to store the software modules discussed herein.

Figure 8:
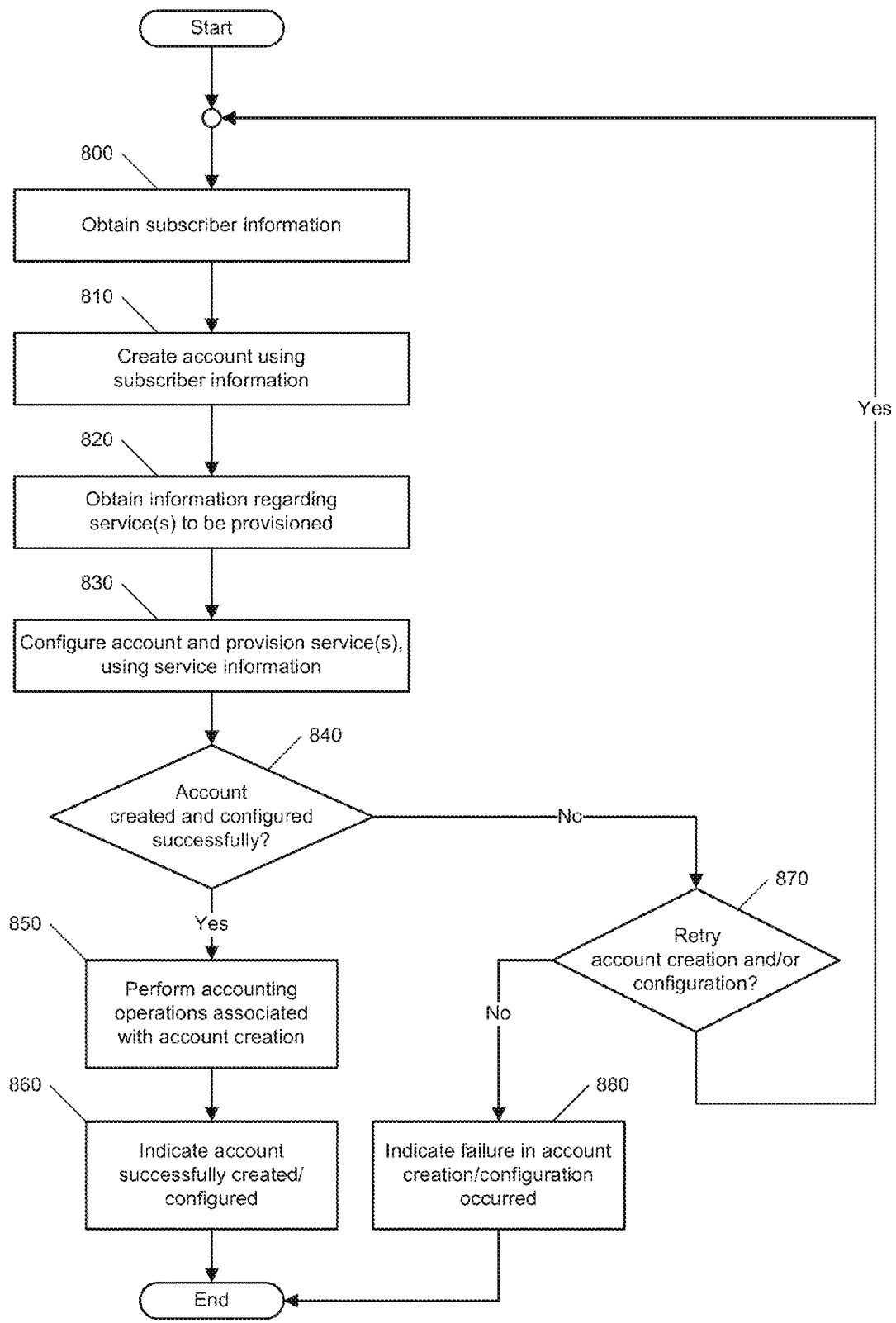
FIG. 8 is a simplified flow diagram illustrating an example of a process for setting up a subscriber account and services, according to embodiments of the methods and systems disclosed herein.

FIG. 8 is a simplified flow diagram illustrating an example of a process for setting up a subscriber account and services, according to embodiments of the methods and systems disclosed herein. FIG. 8 thus depicts a set of example operations for establishing a subscriber account and setting up the services that are to be provided to the subscriber associated with the account. The process begins with a charging system such as that depicted in FIGS. 3 & 4 obtaining the requisite information regarding the subscriber (step 800). Such subscriber information could be obtained by a business and revenue management system via an internal channel such as a customer relationship management system or by way of an online order management system, and fulfilled through an order management system. Once the requisite subscriber information has been obtained, the subscriber's account can be created (step 810). Also obtained is information regarding the service or services that the subscriber would like the service provider to provide (step 820). The subscriber's subscriber information having been obtained, and the subscriber's account having been created, the subscriber's account can be configured and the service(s) desired provisioned using the service information thus obtained (step 830). It will be appreciated that such service information can include thresholds and credit limits such as those described elsewhere herein.

A determination is then made as to whether the account was created and configured successfully (step 840). If the subscriber's account has been created and configured successfully, accounting operations associated with the creation of the subscriber's account are performed (step 850). Such accounting operations can be performed, for example, by a billing and revenue management system such as BRM system 390 of FIG. 3, and can include indications as to use of techniques such as those described herein, provider-defined credit limits and/or thresholds, subscriber-defined thresholds, and the like. The aforementioned operations having been successfully performed, an indication is provided to service provider personnel and the subscriber that the subscriber's account and services are now ready for use (step 860). The process then concludes.

In the event that the subscriber's account was not successfully created and configured (step 840), a determination is made as to whether service provider personnel (or the subscriber themselves) would prefer to retry account creation and/or configuration (step 870). In the event that account creation and/or configurations are to be retried, the process returns to its beginning, and the process proceeds as described earlier. If account creation and/or configuration are not to be retried (step 870), the failure in account creation/configuration is indicated (step 880), and the process concludes.

Figure 9:
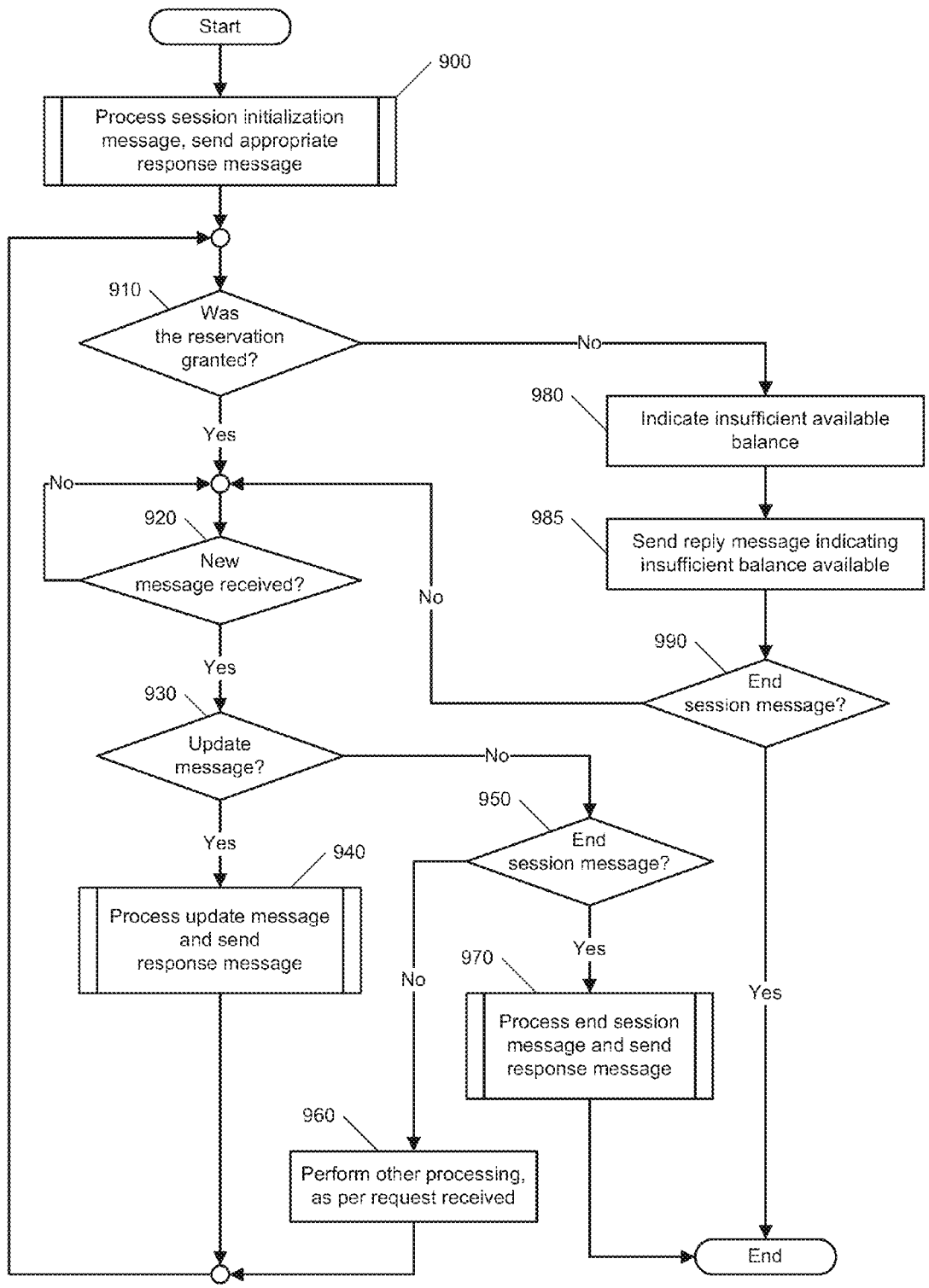
FIG. 9 is a simplified flow diagram illustrating an example of a process for processing one or more new sessions, according to embodiments of the methods and systems disclosed herein.

FIG. 9 is a simplified flow diagram illustrating an example of a process for processing one or more new communications sessions, according to embodiments of the methods and systems disclosed herein. The process depicted in FIG. 9 thus illustrates examples of operations that can be performed in processing one or more new communications sessions in the manner suggested with regard to FIG. 7. A process for processing one or more new communications sessions begins with the charging system processing a session initialization message, and sending a response message in response thereto (step 900). As will be appreciated in view of the present disclosure, the process depicted in FIG. 9 is described from the perspective of a charging system such as charging system 620 of FIG. 6, but can include interactions with a variety of charging system components such as those of network architecture 300 and charging architecture 400, including, for example, BSS 380 (including BRM 390), mediation system 360, and charging engine 370. The process of processing a session initialization message and sending a response thereto is described in greater detail in connection with FIG. 10.

Once the communications session has been initialized, a determination is made as to whether the balance reservation was granted (step 910). Such a request can be granted, for example, if the subscriber's account reflects a sufficient amount of available balance and the balance reservation is reserved. At this juncture, a charging system such as charging system 620 awaits the receipt of a new message (e.g., an update session message, an end session message, or other such message) (step 920). Until a new message is received, the charging system waits, looping until such time as a new message related to the communications session is received. Upon receipt of a new message, a determination is made as to whether the message received is an update message (step 930). In the case in which the message received is an update message, the update message is processed and a response message sent in response thereto (step 940). An example of the processing of and responding to an update message is described in greater detail in connection with FIG. 11. Having processed the update message and sent the response message, the charging system returns to awaiting the next request (step 910).

In the event that the message received is not an update message (step 930), a determination is made as to whether the message received is an end session message (step 950). If other processing is to be performed (and, thus, the message received is neither an update or an end session message), other processing, as per the request received, is performed (step 960). The process then proceeds to awaiting a new message (step 920). If the message received is an end session message (step 950), the end session message is processed and an appropriate response message sent (step 970). An example of the processing of and responding to an end session message is described in greater detail in connection with FIG. 12. Processing of the end session message having been completed, the process then concludes.

As noted elsewhere herein, upon receipt of a request, it may be determined that the subscriber's account does not have (or no longer has) a sufficient balance available for the requested balance reservation to be satisfied (step 910). In such a case, the charging system provides an indication that the account's available balance is insufficient for the request to be granted (step 980) and sends a reply message denying the request for additional balance reservation (step 985). Also in such a case, once the indication has been provided, a determination is made as to whether to continue awaiting message or to terminate the process (step 990), and proceeds accordingly.

Figure 10:
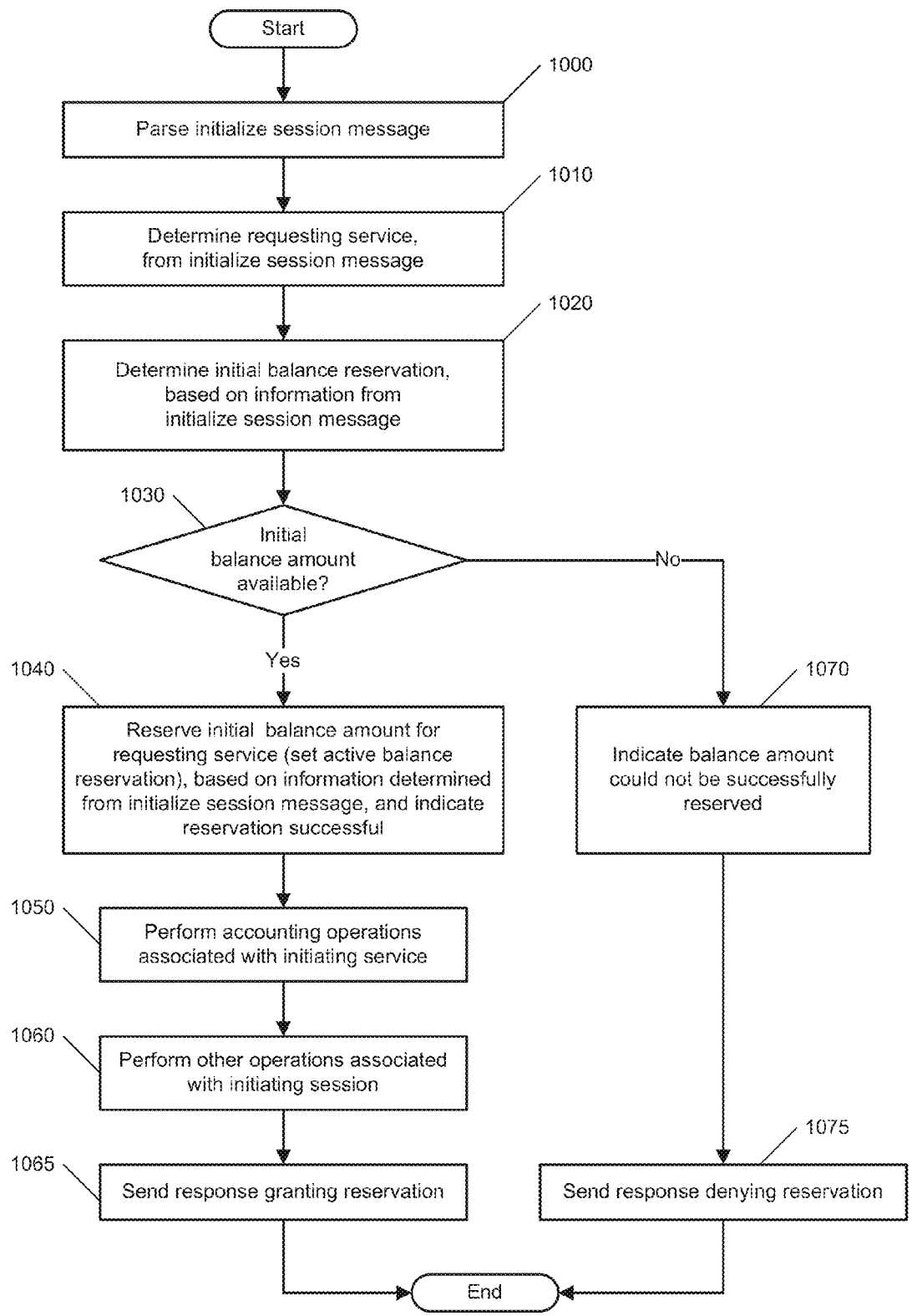
FIG. 10 is a simplified flow diagram illustrating an example of a process for initializing a new session, according to embodiments of the methods and systems disclosed herein.

FIG. 10 is a simplified flow diagram illustrating an example of a process for initializing a new session, according to embodiments of the methods and systems disclosed herein. FIG. 10 thus depicts an example of the operations performed in processing an initialize session message such as initiate session message 640, as noted with regard to FIG. 9. Processing an initialize session message begins with the parsing of the initialize session message (step 1000), which includes extracting the relevant information from the message. Next, the requesting service is determined from the information extracted from the initialize session message (step 1010). Also determined is an initial balance reservation (step 1020). Such a determination can be based, for example, on information from the initialize session message, but can also include information derived from other sources based on information included with the initialize session message.

Information regarding the requesting service and initial balance reservation having been obtained, a determination is then made as to whether the initial balance reservation amount is available (step 1030). If the initial balance reservation amount is available, a balance reservation for this initial balance amount is reserved for the requesting service (and thus, setting the active balance reservation amount), based on the information determined from the initialize session message, and successful reservation of the active balance reservation amount indicated (step 1040). Next, accounting operations associated with initiating the service are performed (step 1050). Such operations can be carried out, for example, by a billing and revenue management system such as BRM system 390. Additionally, any other operations as associated with initiating the session can be performed at this juncture (step 1060). The communications session having been successfully initialized (and the active balance reservation having been reserved), the charging engine sends a response message, indicating grant of the requested balance reservation, to the session controller. The reservation made and the grant indicated, the initialization process can now conclude.

Alternatively, if the initial balance reservation amount is unavailable in the subscriber's account (step 1030), an indication that the requested balance reservation could not be reserved is provided (e.g., within the charging system, but ultimately, to the subscriber and/or the service provider) (step 1070). As noted earlier, the unsuccessful reservation of the desired balance reservation amount can either result in further negotiations between the charging system and session controller, or can result in the termination (in the present scenario, failed initialization) of the communications session. The requested initialization having been unsuccessful, the charging engine sends a response message, denying the request, to the session controller. The request having been denied, the initialization process concludes.

Figure 11:
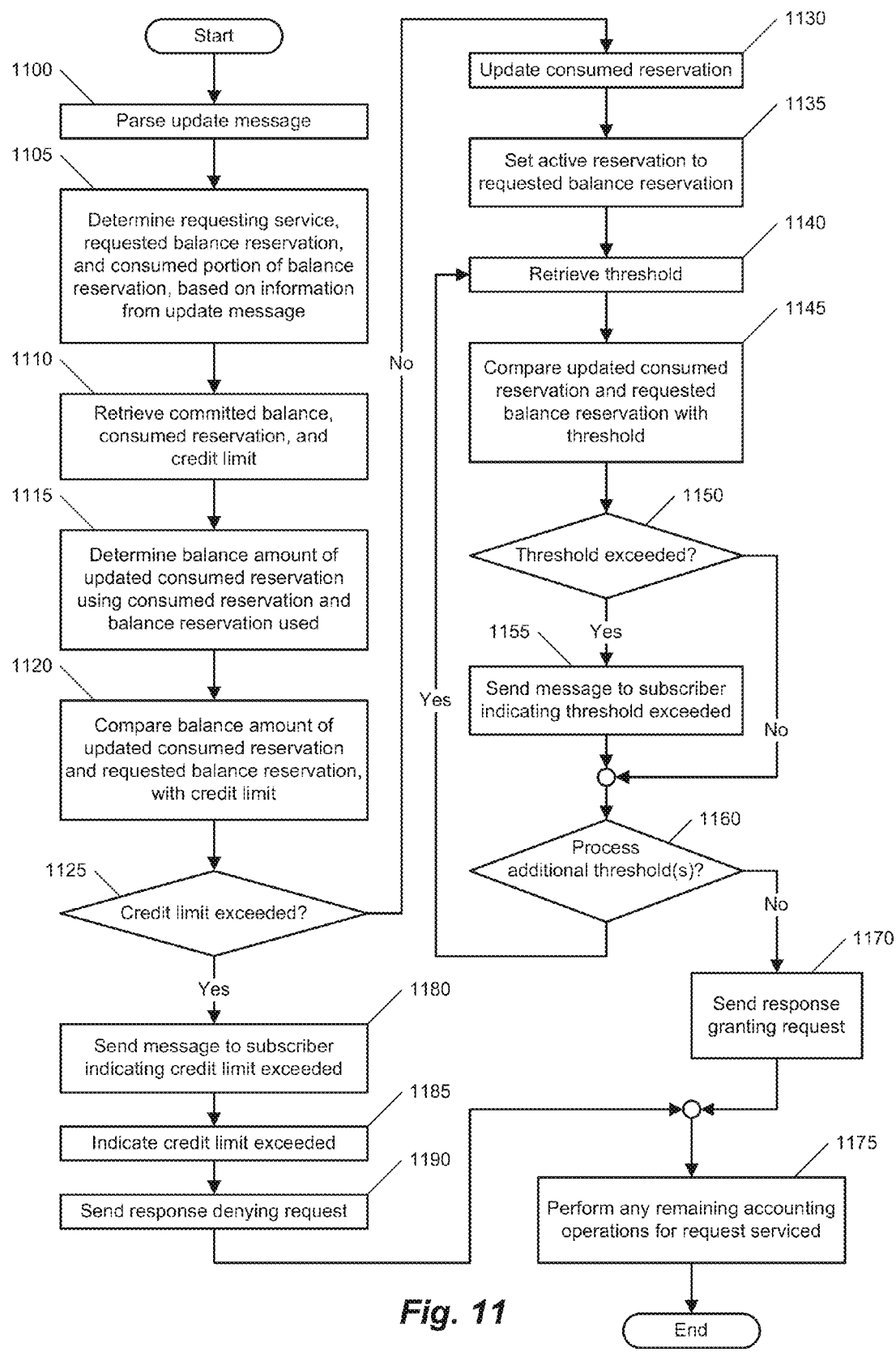
FIG. 11 is a simplified flow diagram illustrating an example of a process for processing and responding to an update message, according to embodiments of the methods and systems disclosed herein.

FIG. 11 is a simplified flow diagram illustrating an example of a process for processing and responding to an update message, according to embodiments of the methods and systems disclosed herein. FIG. 11 thus depicts examples of operations performed in processing an update message such as update session messages 650 and 670, as well as sending a response message in response thereto. The process of FIG. 11 begins with the parsing of the update message (step 1100), which, at least in part, serves to extract the relevant information from the update message. From this information, the requesting service, requested balance reservation, and consumed portion of the earlier balance reservations are determined (step 1105). The charging system then retrieves the committed balance, one or more consumed reservations, and credit limits relevant to the communications session at hand (step 1110). The balance amount of the updated consumed balance reservation is then determined, using the consumed reservation balance(s) and balance reservation used (step 1115). Such a determination can be made in the manner described in connection with the operations depicted in FIG. 6.

The balance amount of the updated consumed balance reservation and requested balance reservation are then compared with the credit limit for the service and account in question (step 1120). A determination is then made as to whether the relevant credit limit(s) have been exceeded (step 1125). In the case in which the relevant credit limit(s) have not been exceeded, the consumed balance reservation in question is updated appropriately (step 1130). The active balance reservation is then set to the requested balance reservation, as per the update message received (step 1135).

If one or more thresholds are to be applied to the communications session, a threshold thereof is retrieved (step 1140). The retrieved threshold may, in fact, be one of many such thresholds, and while the processing of a given balance reservation request in light of such thresholds is depicted in FIG. 11 as being sequential in nature, techniques for applying multiple thresholds to such a balance request are intended to be comprehended by the disclosure presented herein, as will be appreciated in light of that disclosure.

Once the threshold has been retrieved, the updated consumed reservation and requested balance reservation are compared with the thresholds (step 1145). A determination is then made as to whether the updated consumed reservation and requested balance reservation exceed the given threshold (step 1150). As will also be appreciated, such determinations can include a variety of mathematical relationships (e.g., greater than or equal to) and other determinations, and such comparisons are intended to be within the scope of the present disclosure. Further, it will be appreciated that such determinations can also be made with respect to only the consumed reservations, where, for example, the consumed reservations are summed upon receipt of an update message, and that sum compared to the threshold(s). If the threshold in question has been exceeded, a message (notification) can be sent to the subscriber, indicating that such is the case (step 1155). If the given threshold has not been exceeded (step 1150) or the requisite message sent to their subscriber (step 1155), a determination is made as to whether one or more additional thresholds should be processed (step 1160). As will be apparent in light of the present disclosure, other actions may be taken in response to a determination that a given threshold has not been met, including a notification to the subscriber that the communications session should be terminated, a message to the service provider, further analysis of the thresholds, avoiding such further analysis, and other such alternatives, which are intended to come within the scope of the present disclosure. If further thresholds remain to be processed (step 1160), the next threshold is retrieved (step 1140) and the process continues. If no further thresholds are to be processed (step 1160), a response message is sent, granting the requested balance reservation (step 1170). In so doing, the charging system provides the session controller with an indication that the requested balance reservation was successfully reserved, and that the communications session can proceed (step 1170). Once any remaining accounting operations and the like have been performed for the request being serviced (step 1175), the process concludes.

In the case in which the credit limit for the account and/or service being provided has been exceeded (step 1125), a message is sent to the subscriber indicating that the relevant credit limit has been exceeded (step 1180). Further, the charging system can indicate to various ones of the business systems that the credit limit has been exceeded (step 1185). Such indication can also be used by a process such as that depicted in FIG. 7 as charging process 700. At this juncture, the charging system sends a response message to the session controller indicating that the requested balance reservation could not be reserved, and that the request is therefore being denied, as a result of the relevant credit limit having been exceeded (step 1190). The denial having been sent, any remaining accounting operations relating to the request having been serviced (and denied) are performed (step 1175), and the process concludes.

Figure 12:
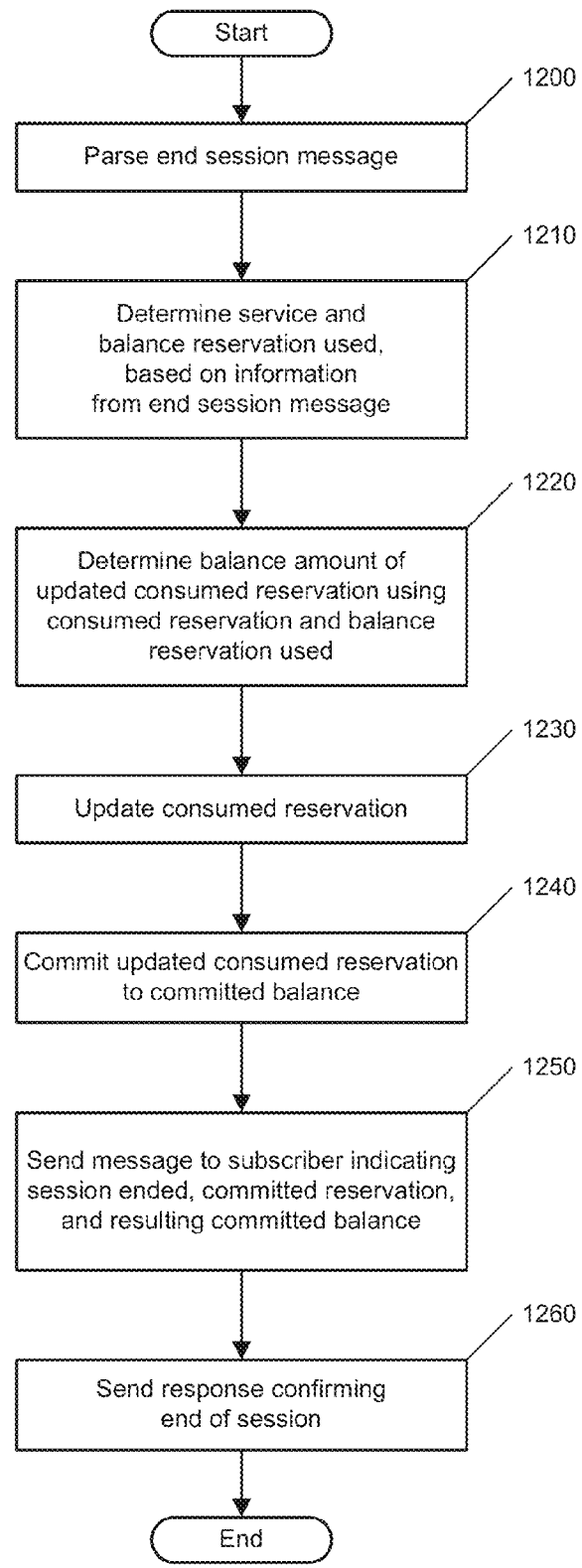
FIG. 12 is a simplified flow diagram illustrating an example of a process for processing and responding to an end session message, according to embodiments of the methods and systems disclosed herein.

FIG. 12 is a simplified flow diagram illustrating an example of the processing of an end session message and response thereto, according to embodiments of the methods and systems disclosed herein. FIG. 12 thus depicts examples of the operations that can be performed in processing and end session message such as end session message 680. The processing of an end session message, as depicted in FIG. 12, begins with the parsing of the end session message (step 1200). As with the processing of others of such messages, a determination as to the service and balance reservation used is made, based on information from the end session message received (step 1210). Next, a determination is made as to the balance amount of the updated consumed reservation, using the consumed balance reservation and the balance reservation used (step 1220). These determinations having been made, the consumed balance reservation can be updated (step 1230). The updated consumed balance reservation can then be committed to the committed balance (step 1240). Such an operation can be performed, for example, by way of communications between the charging engine (e.g., charging engine 370) and components of the business support system (e.g., BRM system 390). If desired, a message can then be sent to the subscriber, indicating information such as the time that the communications session ended, the amount of consumed balance reservation (i.e., the amount of charges), and the resulting committed balance (e.g., the outstanding balance for their account) (step 1250). As response message is then sent from the charging system to the session controller, confirming the end of the communications session (step 1260).

FIG. 13A is a simplified block diagram illustrating an example of a charging timeline, according to embodiments of the methods and systems disclosed herein. FIG. 13A thus depicts a charging timeline 1300, in which balance reservations, including active balance reservations and consumed balance reservations, are employed in order to provide the benefits of such methods and systems. Charging timeline 1300 presents time on the X-axis and charges on the Y-axis, and includes a credit limit 1302 and a balance threshold 1304, in the manner of such elements described previously. At time $t_0$ on charging timeline 1300, a committed balance 1310, and available balance 1312 are shown.

In response to a request for a first balance reservation (e.g., a session initialization message or an update message), the charging system reserves an active balance reservation 1315 at time $t_1$. Subsequently, an update message is received by the charging system, indicating an amount of balance reservation actually consumed (a consumed balance reservation), for example. This results, at a time $t_2$, in a consumed balance reservation 1316 (as well as an unused balance reservation 1317). At this juncture, the charging system can grant an additional balance reservation by an amount that, for example, exceeds neither credit limit 1302, nor balance threshold 1304. Such is the case, for example, at time $t_3$ of charging timeline 1300, at which point an active balance reservation 1320 is made. As will be appreciated in light of the present disclosure, the situation depicted at time $t_3$ on charging timeline 1300 reflects a scenario comparable to that depicted in FIG. 5. In that regard, available balance 1312, active balance reservation 1320, consumed balance reservation 1316, and committed balance 1310 mirror those portions of the subscriber's balance, as reflected in FIG. 5.

Moving along charging timeline 1300 to a time $t_4$, the result of the receipt of another update message can be seen, reflecting the fact that active balance reservation 1320 has now had a portion thereof consumed. This consumed portion appears as consumed balance reservation 1322 (as well as an unused portion of active balance reservation 1320, depicted as an unused balance reservation 1324). The state of the subscriber's balance is depicted at a time $t_5$ as having a committed balance and a consumed balance reservation that include committed balance 1310, consumed balance reservation 1316, and consumed balance reservation 1322, with available balance 1322 remaining.

At a time $t_6$, in response to the receipt of an update message, the charging system goes about granting an active balance reservation 1330. At this juncture in certain embodiments, while such a balance reservation would not exceed the subscriber's credit limit (credit limit 1302), the subscriber can be alerted to balance threshold 1304 being exceeded by the recent balance reservation. It will be appreciated that such an event does not necessarily indicate that balance threshold 1304 will be exceeded, but only that balance threshold 1304 could be exceeded (since the amount of active balance reservation 1330 actually consumed is unknown at this point). By the same token, using such an approach, the charging system is able to generate such alerts earlier than basing such indications on committed balances/consumed balance reservations alone.

Since such a balance reservation would not exceed the subscriber's credit limit (credit limit 1302), even if entirely consumed, the subscriber (or more typically, the service provider, for the first such alert (given the timing of such decisions)) can choose to allow the transaction to proceed, being aware of the possibility that upon consumption, the total balance could exceed balance threshold 1304. Thus, while the aggregation of committed balance 1310, consumed balance reservation 1316, consumed balance reservation 1322, and active balance reservation 1330 exceed balance threshold 1304, in fact, the actual total balance could remain at a level below balance threshold 1304 (and does, in fact, as depicted in FIG. 13A). To that end, as depicted on charging timeline 1300 at a time $t_7$, the subscriber's balance reflects an amount that is the aggregation of committed balance 1310, consumed balance reservation 1316, consumed balance reservation 1322, and a consumed balance reservation 1332. In such a situation, an unused balance reservation 1334 is, in effect, returned to available balance 1312.

Subsequently, the next consumed balance reservation of an active balance reservation may, in fact, exceed balance threshold 1304. Such a situation is depicted in FIG. 13A at times $t_8$, $t_9$, and $t_{10}$ on charging timeline 1300, where an active balance reservation 1340 at a time $t_8$ results in, when aggregated with consumed balance reservations 1316, 1322, and 1332, balance threshold 1304 being exceeded. As noted, such a situation can be handled through the generation of an alert to the subscriber and/or service provider.

Alternatively (and as noted), such alerts can be generated based on the existing consumed balance reservations alone. For example, as part of processing an update session message (e.g., update session messages 650 or 670), such an alert can be generated upon receipt of that message, if the then-current total of the consumed balance reservations and committed balance exceed the relevant balance threshold. Such determinations can be made in response to the receipt of an end session message (at the conclusion of the communications session), as well. Such is the case at time $t_9$ on charging timeline 1300, in fact, where consumption of portions of active balance reservation 1340 results in a consumed balance reservation 1342 and an unused balance reservation 1344. As can be seen, the aggregation of committed balance 1310, and consumed balance reservations 1316, 1322, 1332, and 1342 exceed balance threshold 1304. It is at this juncture that a threshold based only on consumed balance reservations is triggered. Further, as will be appreciated in light of the present disclosure, such techniques can be combined, with alerts triggered by active balance reservations and/or consumed balance reservations, in any meaningful combination. Further still, the basis for such alerts can be determined using logical relationships therebetween (AND, OR, XOR, and so on), calculations (e.g., determining by what amount a threshold is exceeded), timing (at what point in time, how long ago/recently, and so on, that a given threshold or thresholds were triggered), among and between service types (e.g., data, text, voice, and so on), and/or other such criteria, as may be determined from existing information (committed balances, requested balance reservations, consumed balance reservations), historical information, and current information (e.g., information included in update session requests and end session requests). As will be appreciated in light of the present disclosure, in response to the receipt of an end session message, consumed balance reservations 1316, 1322, 1332, and 1342 can then be committed, for example.

Figure 13B:
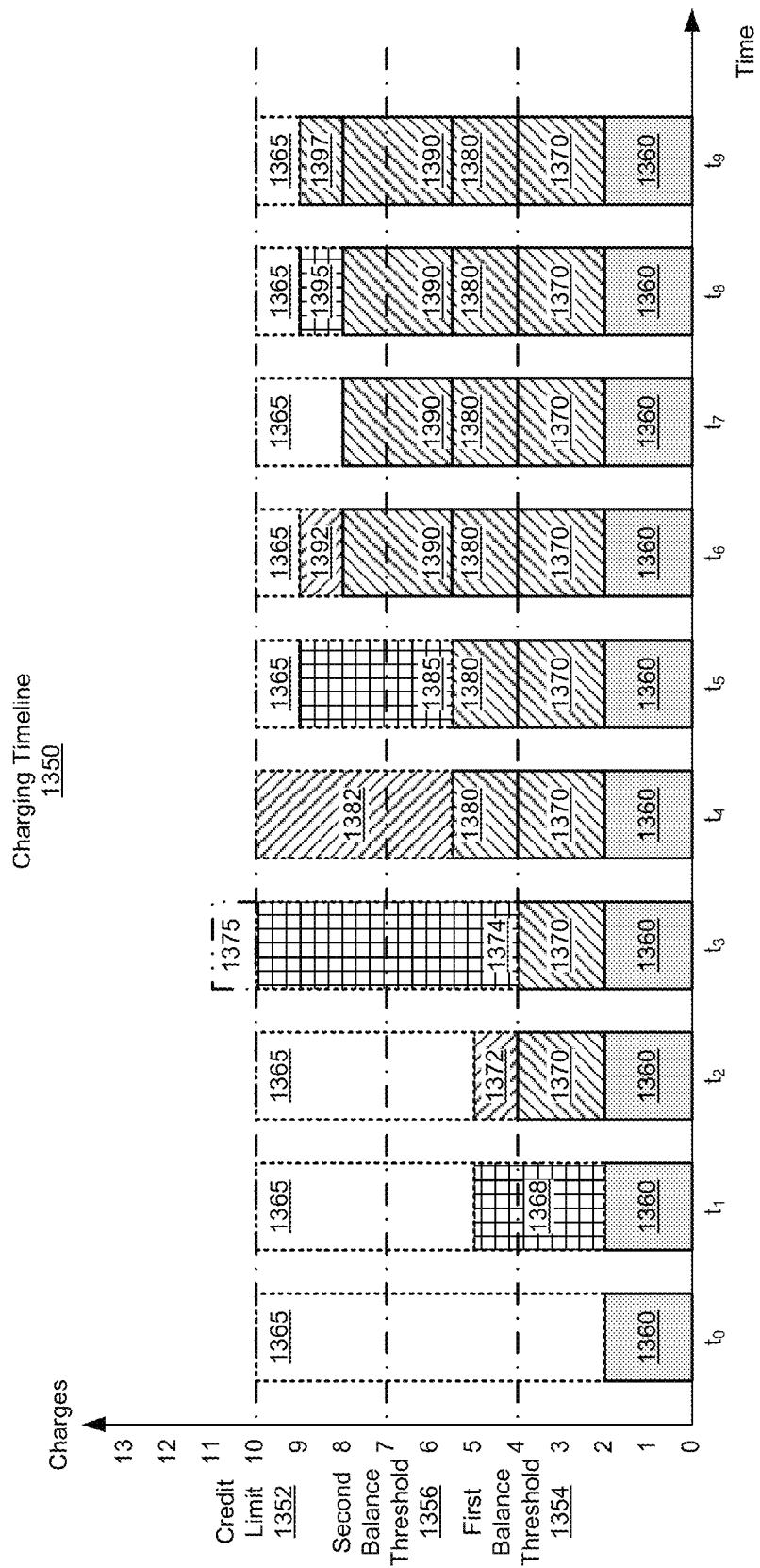
FIG. 13B is a simplified block diagram illustrating an example of another charging timeline, according to embodiments of the methods and systems disclosed herein.

FIG. 13B is a simplified block diagram illustrating an example of another charging timeline, according to embodiments of the methods and systems disclosed herein. FIG. 13B thus depicts a charging timeline 1350, which includes, as depicted, a credit limit 1352, a first balanced threshold 1354, and a second balance threshold 1356. As before, charging timeline 1350 begins at a time $t_0$ where a committed balance 1360 and an available balance 1365 are depicted. At time $t_1$, an active balance reservation 1368 is reserved, as per a request received prior thereto, initiating a communications session. This situation can result in the generation of an alert (in the manner noted previously), in the case in which active balance reservations are used in this regard.

Next, an update message is received, as indicated in charging timeline 1350 at a time $t_2$, where an indication as to the actual balance reservation consumed is received. Such information is reflected in charging timeline 1350 by a consumed balance reservation 1370 and an unused balance reservation 1372. In this situation, if only consumed balance reservations are used in generating alerts, an alert need not be generated (as the aggregate of committed balance 1360 and consumed balance reservation 1370 does not exceed first balanced threshold 1354).

Next, at a time $t_3$, a reservation is made in response to the receipt of an update message, granting a balance reservation beyond first balance threshold 1354, and second balance threshold 1356, up to credit limit 1352. As before, in the case in which active balance reservations are used in this regard, alerts are generated in view of both first balanced threshold 1354 and second balance threshold 1356 being exceeded. However, since the amount of consumed balance reservation 1370 is known, and given the amount of the active balance reservation made (an active balance reservation 1374), an excess portion 1375 above credit limit 1352 is avoided. Thus, having avoided a situation in which credit limit 1352 is exceeded, the overhead, resources, and complications associated with such a condition are avoided, saving the service provider money and the subscriber, aggravation, and so providing the subscriber with an improved user experience.

At a time $t_4$, balance reservation 1374 is shown as having been subject to an update message, resulting in a consumed balance reservation 1380 and an unused balance reservation 1382. In this situation, if only consumed balance reservations are used in generating alerts, an alert is generated (as the aggregate of committed balance 1360 and consumed balance reservations 1370 and 1380 exceeds first balanced threshold 1354). However, as can be seen, not only does the situation at time $t_4$ not result in the exceeding of credit limit 1352 (and the associated overhead, resources, and complications avoided), but as consumed balance reservation 1380 demonstrates, such efforts would have been for naught in any event, the aggregate of committed balance 1360 with consumed balance reservations 1370 and 1380 being less than even second balance threshold 1356, much less credit limit 1352.

At time $t_5$, an active balance reservation 1385 is reserved, which exceeds second balance threshold 1356. This situation can result in the generation of an alert (in the manner noted previously), in the case in which active balance reservations are used in this regard. Alternatively, if only consumed balance reservations are used in generating alerts, no alert need be generated, as the aggregate of committed balance 1360 and consumed balance reservations 1370 and 1380 does not exceed second balance threshold 1356.

However, at time $t_6$, a consumed balance reservation 1382 exceeds second balance threshold 1356, though an unused portion of balance reservation 1385 remains (depicted in FIG. 13 as an unused balance reservation 1392). An alert is thus generated, indicating that second balance threshold 1356 has been exceeded, which is handled in a manner comparable to that described earlier.

At time $t_7$, then, the consumed balance reservations include consumed balance reservations 1370, 1380, and 1390, in addition to committed balance 1360, the aggregate of which exceeds both first balance threshold 1354 and second balance threshold 1356. At a time $t_8$, an active balance reservation 1395 is reserved. Balance reservation 1395 is completely consumed, resulting in a consumed balance reservation 1397. Upon the conclusion of communications session (not shown), the total committed balance of the subscriber's account, as per charging timeline 1350, stands at nine charging units (the aggregate of committed balance 1360 and consumed balance reservations 1370, 1380, and 1390).

Figure 14:
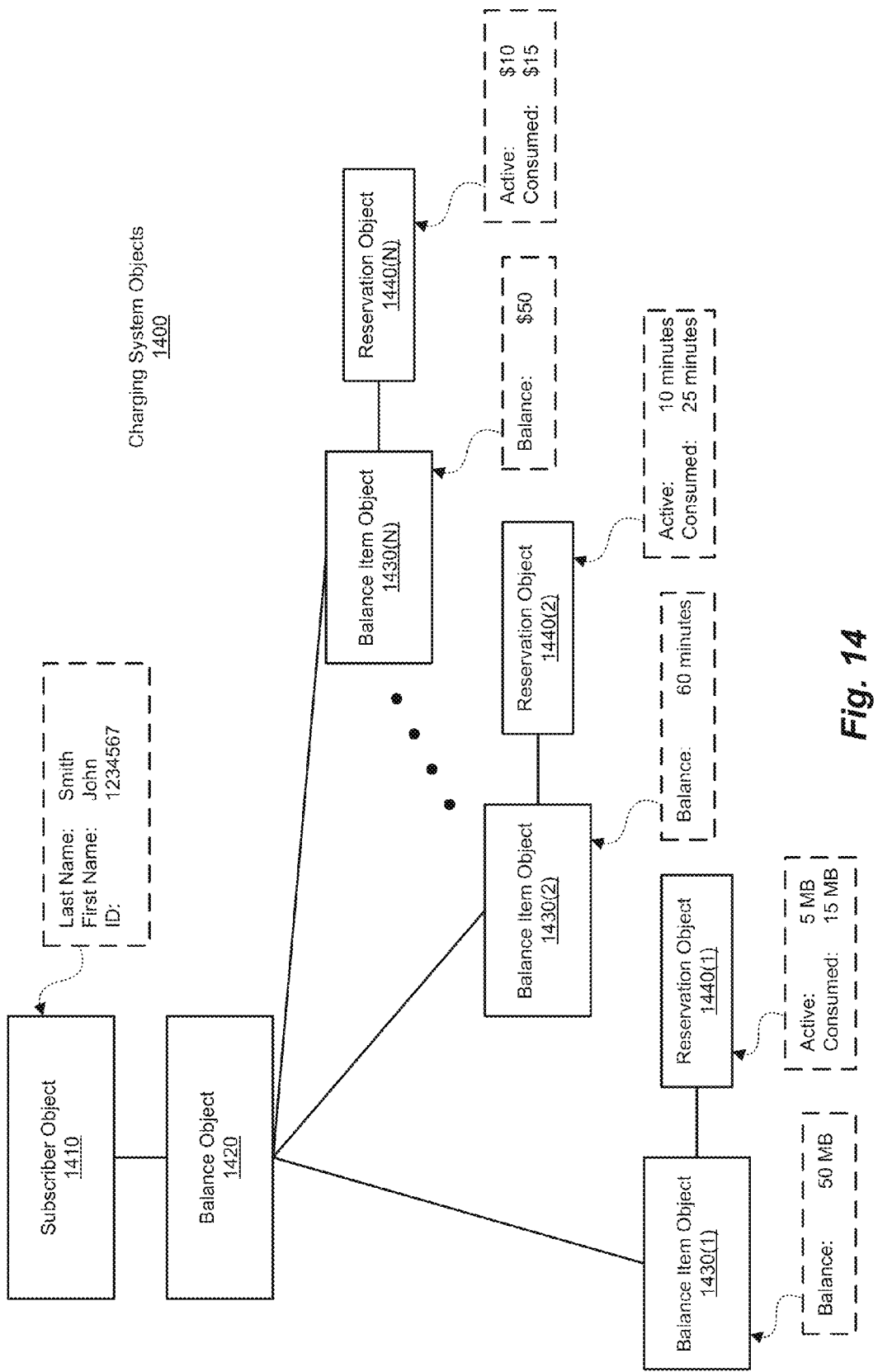
FIG. 14 is a simplified block diagram illustrating an example of charging system objects, according to embodiments of the methods and systems disclosed herein.

FIG. 14 is a simplified block diagram illustrating an example of charging system objects, according to embodiments of the methods and systems disclosed herein. FIG. 14 thus depicts a number of charging system objects (depicted in FIG. 14 as charging system objects 1400), which provide examples of the structures in which balance information according to the methods and systems disclosed herein can be stored and processed. That being the case, charging system objects 1400 include a subscriber object 1410, which has as a child object a balance object 1420. Subscriber object 1410 maintains information regarding a given subscriber such as a last name, a first name, and an identification number (examples of which are depicted in FIG. 14). The subscriber information maintained in subscriber object 1410 can, for example, include information such as the subscriber information obtained in the process depicted in FIG. 8. Balance object 1420 has as child objects, for example, a number of balance item objects (depicted in FIG. 14 as balance item objects 1430(1)-(N)). In turn, balance item objects 1430(1)-(N) have as child objects one or more reservation objects (depicted in FIG. 14 as reservation objects 1440(1)-(N). As can be seen in FIG. 14, balance item objects 1430(1)-(N) maintain information regarding a subscriber's balances for a given type of service (e.g., balance item object 1430(1) maintains information regarding a data balance of 50 MB; balance item object 1430(2) maintains information regarding remaining minutes for voice telephone calls; and balance item object 1430(N) maintains information regarding a dollar value balance for another service (or for use in the subscriber's data or voice sessions)). Similarly, reservation objects 1440(1)-(N) maintain information regarding a given communications session using a corresponding service. Thus, for example, reservation object 1440(2) maintains information regarding an active balance reservation (10 minutes) and a consumed balance reservation (25 minutes). Such information can be used in the processes described earlier.

Further, the structure of charging system objects 1400 lends itself to facilitating those processes. A construct such as charging system objects 1400 offers, for example, a runtime model that provides fin grained control over and tracking of information through the use of domain entities. The persistence model such a construct offers also provides for coarse-grained control over characteristics that may apply to a number thereof, or to others. Benefits include the efficient storage of and access to such information, and compact representation of such information in the memory and storage systems of charging systems such as those described herein.

With regard to the elements of FIG. 14, the subscriber, as indicated in relation to subscriber object 1410, is one John Smith with a subscriber identifier of 1234567 (which can be, for example, a telephone number, of the form (area_code) 123-4567). Subscriber John Smith's balance, as depicted in relation to balance item object 1430(N), is currently $50, with an active balance reservation of $10 and a consumed balance reservation of $15 (as indicated in relation to reservation object 1440(N)). Further, subscriber John Smith has a "free minute" balance of 60 minutes, with an active balance reservation of 10 minutes and a consumed balance reservation of 25 minutes (in relation to balance item object 1430(2) and reservation object 1440(2), respectively). In a similar fashion, subscriber John Smith has a data balance of 50 MB, with an active balance reservation of 5 MB and a consumed balance reservation of 15 MB (in relation to balance item object 1430(1) and reservation object 1440(1), respectively).

Figure 15:
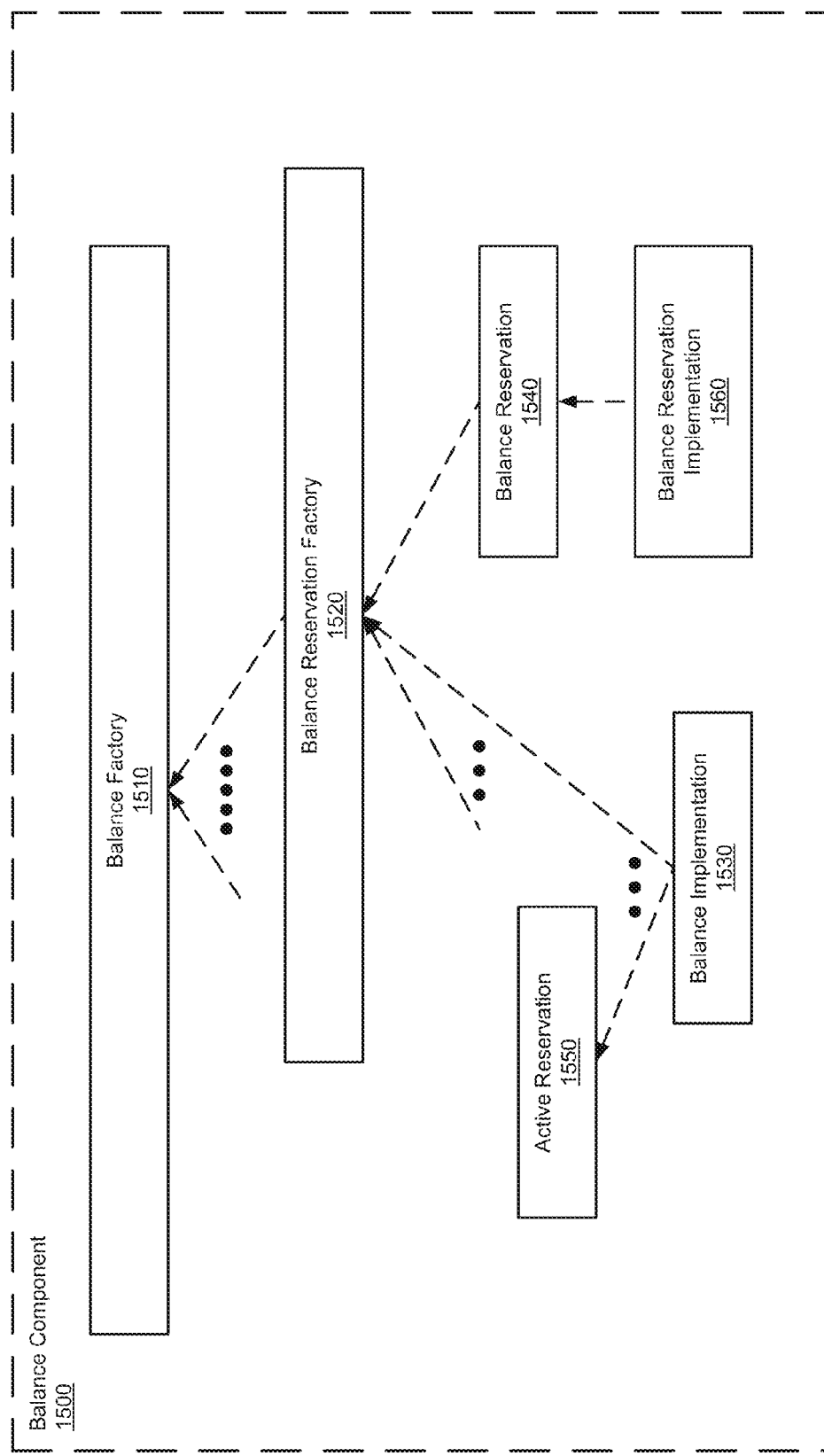
FIG. 15 is a simplified block diagram illustrating an example of a balance component, according to embodiments of the methods and systems disclosed herein.

FIG. 15 is a simplified block diagram illustrating an example of a balance component, according to embodiments of the methods and systems disclosed herein. From an object oriented programming perspective, the aforementioned objects can be implemented in a manner such as that depicted in FIGS. 15 and 16. For example, a balance component 1500 is depicted in FIG. 15, and illustrates the relationships between certain of the structures and the methods that employ them. That being the case, balance component 1500 includes a balance factory 1510, which, in turn, includes a balance reservation factory 1520. Balance reservation factory 1520, in turn, employs one or more balance implementations 1530 and a balance reservation 1540. In the manner depicted in FIG. 14, balance implementation 1530 has associated with it an active reservation 1550. Similarly, balance reservation 1540 has associated with it a balance reservation implementation 1560.

Figure 16:
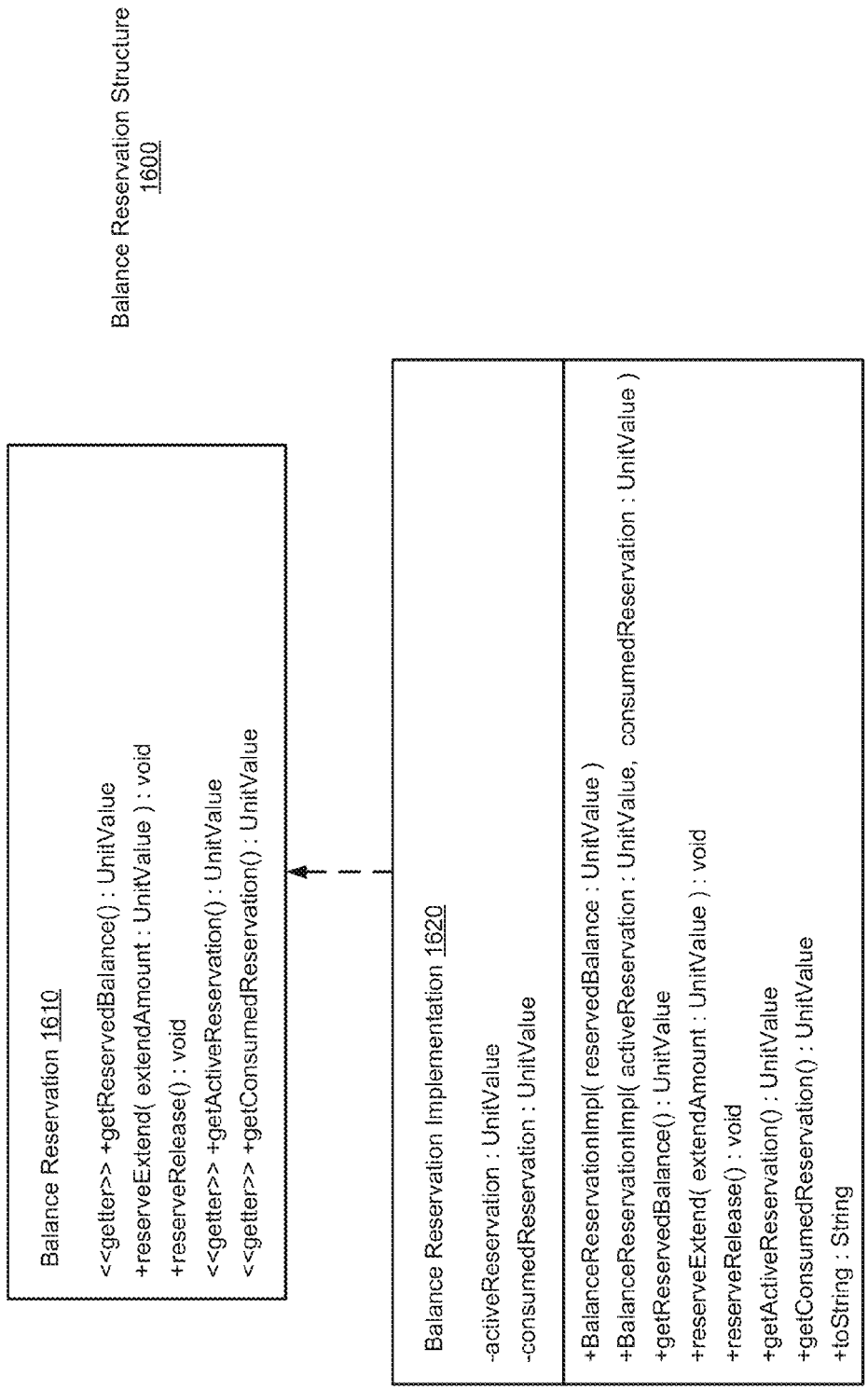
FIG. 16 is a simplified block diagram illustrating an example of a balance reservation structure, according to embodiments of the methods and systems disclosed herein.

FIG. 16 is a simplified block diagram illustrating an example of a balance reservation structure, according to embodiments of the methods and systems disclosed herein. That being the case, FIG. 16 depicts a balance reservation structure 1600. Balance reservation structure 1600 includes, for example, a balance reservation 1610, and its associated definitions. Balance reservation 1610 can be implemented using, for example, a balance reservation implementation 1620, and its associated methods and structures. Further information with regard to various constructs, mechanisms, operations, and features appear in Appendix A, which is attached hereto and is incorporated herein by reference, in its entirety and for all purposes.

Figure 17:
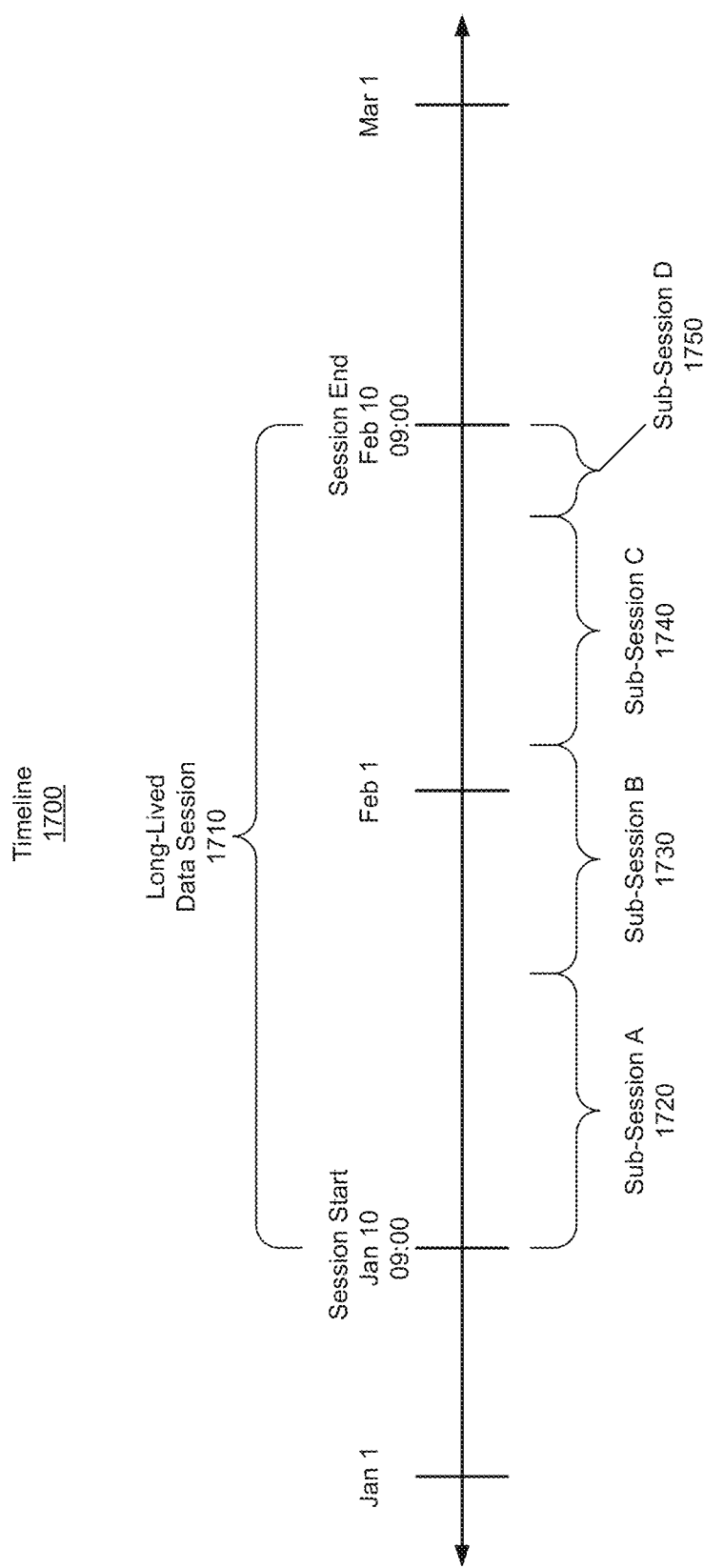
FIG. 17 is a simplified block diagram illustrating an example of a timeline, in which a long-lived data session is depicted, according to embodiments of the methods and systems disclosed herein.

FIG. 17 is a simplified block diagram illustrating an example of a timeline, in which a long-lived data session is depicted, according to embodiments of the methods and systems disclosed herein. Using existing approaches, as noted, today's service providers can only recognized revenue for data sessions that have been terminated. Thus, such service providers must periodically cut long running communications sessions in order to be able to recognize the revenue for the services already used by their subscribers. This can (and often does) result in a reduced customer experience. With the more frequent occurrence of long running data sessions (which can span several days or weeks), service providers are in a position of being unable to recognize revenue for such data sessions until long after such communications sessions have been initiated (e.g., recognizing revenue in the month in which the session was initiated, for example). Tracking the consumed balance reservations makes it possible to periodically create a subsession using information from messages configured in the manner described herein, to create a rated record which can be passed on to billing systems and used to recognize revenue for some of the usage in the period (e.g., month) in which the communications session was initiated.

In view of this, FIG. 17 depicts a timeline 1700. As can be seen in FIG. 17, timeline 1700 runs from one hypothetical date to another (and, as depicted in FIG. 17, from January 1 through March 1 of a given year). Depicted on timeline 1700 is a long-lived data session 1710, which runs for 37 days in the given year. Such long-lived data sessions can create problems for service providers and subscribers alike. For example, using the scenarios depicted earlier, long-lived data session 1710 precludes the subscriber and the service provider from being able to know what the subscriber's consumption and balances might be until such time as the long-lived data session ends (February 10). However, given the ability to make such determinations using the methods and systems described herein, long-lived data session 1710 can be broken up into sub-sessions (depicted in FIG. 17 as a sub-session A 1720, a sub-session B 1730, a sub-session C 1740, and a sub-session D 1750).

As note, long-lived data session 1710 is started on January 10 and runs until February 16. Without the use of consumed balances reservations, as well as others of the techniques described herein, the revenue for this session would only be recognized at the end of February (e.g., as of March 1). Further, such recognition mandates that the session end, to allow for such recognition. Through the use of the techniques described herein, the session can be periodically segmented into sub-sessions (in this case, four sub-sessions), and the revenue recognized for each of them. In this example, the revenue for sub-session A 1720 and sub-session B 1730 can be recognized at the end of January, while the revenue for sub-session C 1740 and sub-session D 1750 can be recognized at the end of February. The granularity of the segmentation of the sessions can be configured to meet various revenue recognition requirements of the service provider, and can be configured thusly in a static, pre-configured manner, or dynamically, as communications network conditions, policies, and other circumstances change.

An Example Computing and Network Environment

As described above, the systems described herein can be implemented using a variety of computer systems and networks. Examples of such computing and network environments are described below with reference to FIGS. 18 and 19.

Figure 18:
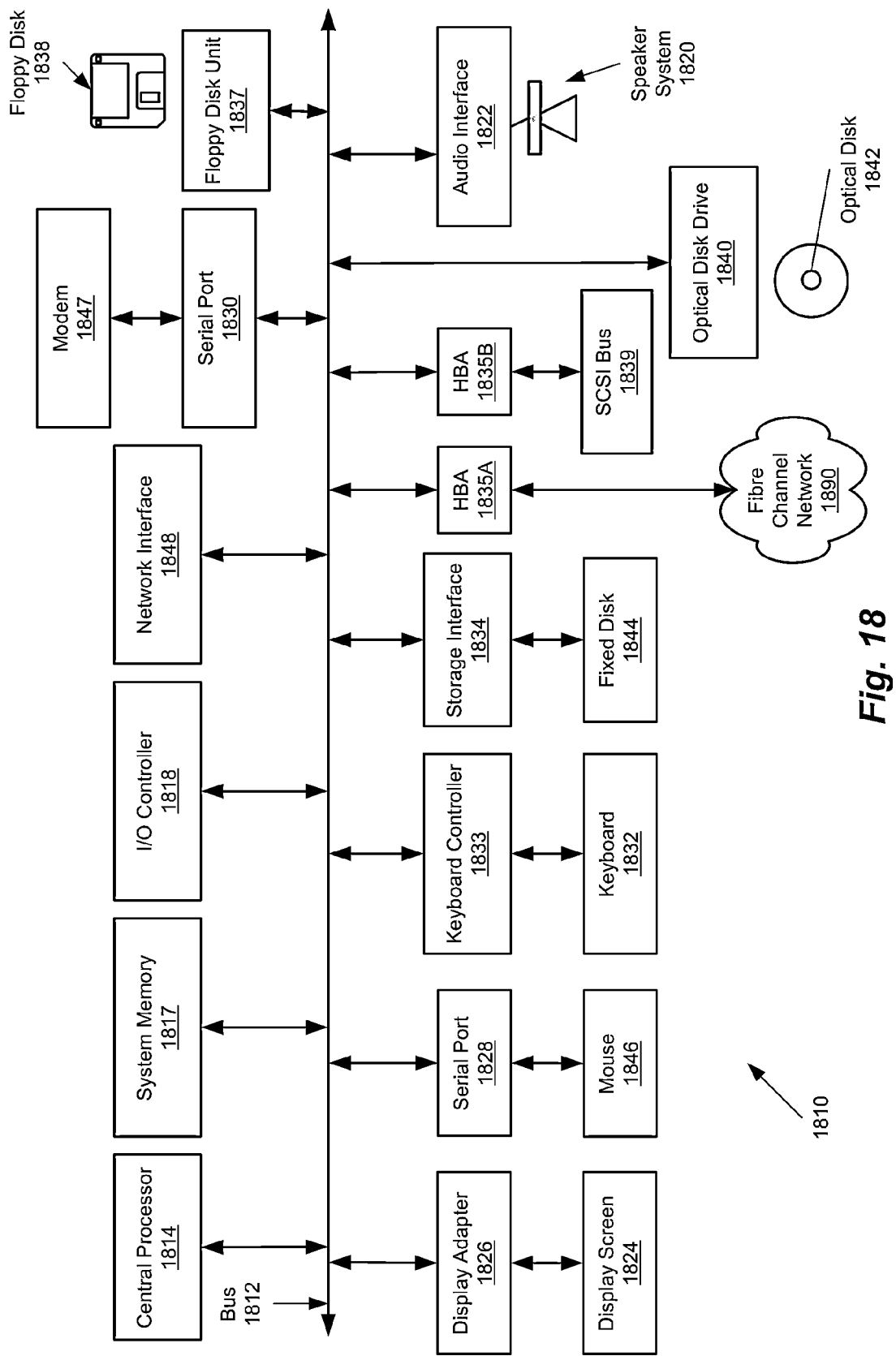
FIG. 18 is a block diagram depicting a computer system suitable for implementing aspects of systems according to embodiments of systems such as those disclosed herein.

FIG. 18 depicts a block diagram of a computer system 1810 suitable for implementing aspects of the present invention. Computer system 1810 includes a bus 1812 which interconnects major subsystems of computer system 1810, such as a central processor 1814, a system memory 1817 (typically RAM, but which may also include ROM, flash RAM, or the like), an input/output controller 1818, an external audio device, such as a speaker system 1820 via an audio output interface 1822, an external device, such as a display screen 1824 via display adapter 1826, serial ports 1828 and 1830, a keyboard 1832 (interfaced with a keyboard controller 1833), a storage interface 1834, a floppy disk drive 1837 operative to receive a floppy disk 1838, a host bus adapter (HBA0) interface card 1835A operative to connect with a Fibre Channel network 1890, a host bus adapter (HBA) interface card 1835B operative to connect to a SCSI bus 1839, and an optical disk drive 1840 operative to receive an optical disk 1842. Also included are a mouse 1846 (or other point-and-click device, coupled to bus 1812 via serial port 1828), a modem 1847 (coupled to bus 1812 via serial port 1830), and a network interface 1848 (coupled directly to bus 1812).

Bus 1812 allows data communication between central processor 1814 and system memory 1817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1810 are generally stored on and accessed via a computer-readable medium, such as a hard disk drive (e.g., fixed disk 1844), an optical drive (e.g., optical drive 1840), a floppy disk unit 1837, or other storage medium. Additionally, applications can be in the form of electronic signals modulated in accordance with the application and data communication technology when accessed via network modem 1847 or interface 1848.

Storage interface 1834, as with the other storage interfaces of computer system 1810, can connect to a standard computer-readable medium for storage and/or retrieval of information, such as a fixed disk drive 1844. Fixed disk drive 1844 may be a part of computer system 1810 or may be separate and accessed through other interface systems. Modem 1847 may provide a direct connection to a remote server via a telephone link or to the Internet via an internet service provider (ISP). Network interface 1848 may provide a direct connection to a remote server via a direct network link to the Internet via a POP (point of presence). Network interface 1848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 18 need not be present to practice the present invention. The devices and subsystems can be interconnected in different ways from that shown in FIG. 18. The operation of a computer system such as that shown in FIG. 18 is readily known in the art and is not discussed in detail in this application. Code to implement the present invention can be stored in computer-readable storage media such as one or more of system memory 1817, fixed disk 1844, optical disk 1842, or floppy disk 1838. The operating system provided on computer system 1810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 19:
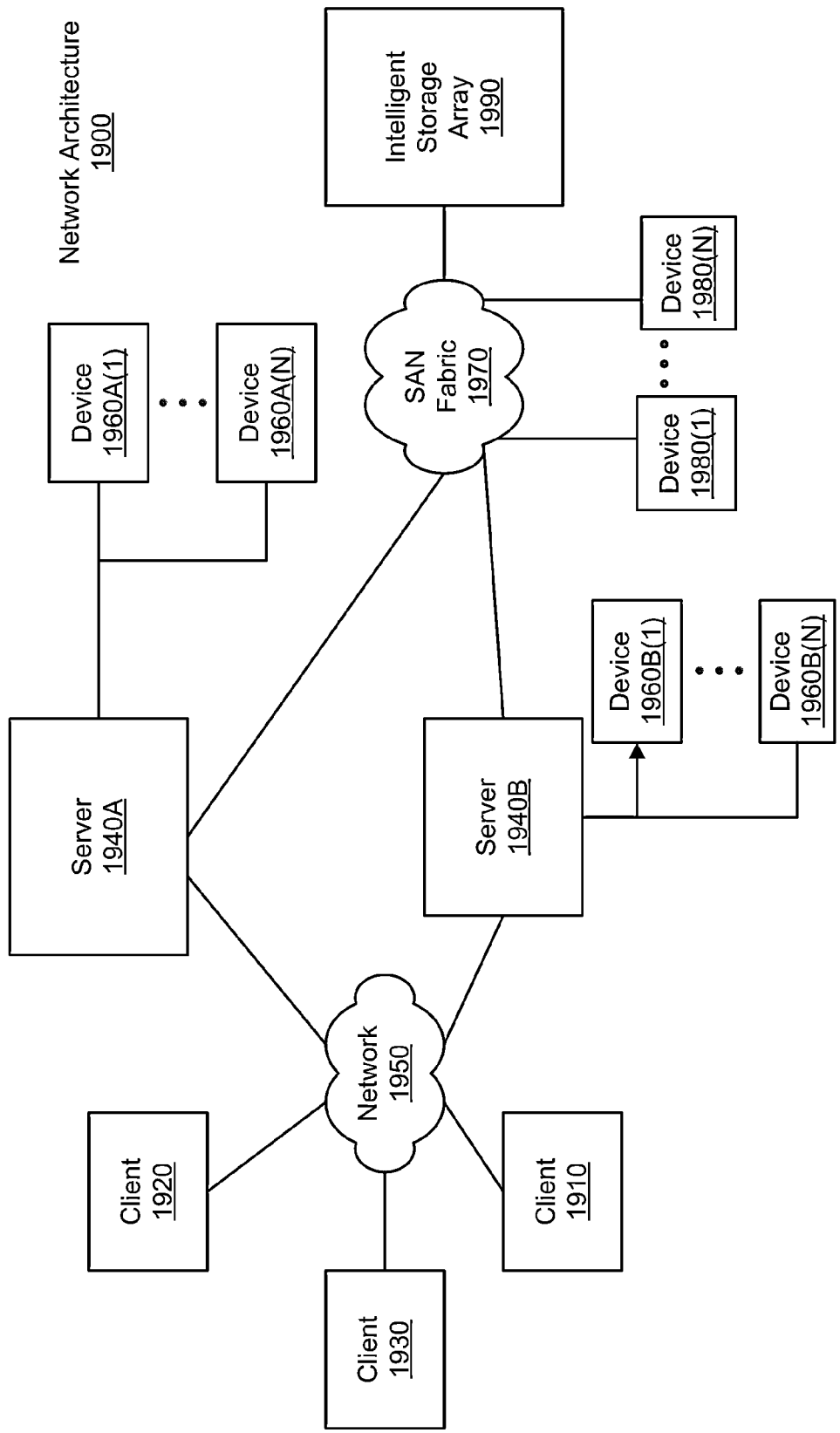
FIG. 19 is a block diagram depicting a network architecture suitable for implementing aspects of systems according to embodiments of systems such as those disclosed herein.

FIG. 19 is a block diagram depicting a network architecture 1900 in which client systems 1910, 1920 and 1930, as well as storage servers 1940A and 1940B (any of which can be implemented using computer system 1910), are coupled to a network 1950. Storage server 1940A is further depicted as having storage devices 1960A(1)-(N) directly attached, and storage server 1940B is depicted with storage devices 1960B(1)-(N) directly attached. Storage servers 1940A and 1940B are also connected to a SAN fabric 1970, although connection to a storage area network is not required for operation of the invention. SAN fabric 1970 supports access to storage devices 1980(1)-(N) by storage servers 1940A and 1940B, and so by client systems 1910, 1920 and 1930 via network 1950. Intelligent storage array 1990 is also shown as an example of a specific storage device accessible via SAN fabric 1970.

With reference to computer system 1910, modem 1947, network interface 1948 or some other method can be used to provide connectivity from each of client computer systems 1910, 1920 and 1930 to network 1950. Client systems 1910, 1920 and 1930 are able to access information on storage server 1940A or 1940B using, for example, a web browser or other client software (not shown). Such a client allows client systems 1910, 1920 and 1930 to access data hosted by storage server 1940A or 1940B or one of storage devices 1960A(1)-(N), 1960B(1)-(N), 1980(1)-(N) or intelligent storage array 1990. FIG. 19 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1710). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized systems illustrated in the figures described herein.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   receiving, at a charging engine implemented on one or more processors, a usage request for a subscriber of a telecommunications network and, in response, creating a balance reservation for the subscriber to reserve a first portion of pre-paid usage of the telecommunications network for the subscriber to satisfy the usage request;
   receiving an update request to update the usage request, wherein
      the update request is received at the charging engine, and
      the update request comprises
         information specifying a consumed portion of the balance reservation that the subscriber has consumed based on the usage request; and
   in response to the receiving the update request, updating the balance reservation to reserve a second portion of the pre-paid usage of the telecommunications network based on the update request and the usage request and, separately, creating a consumed balance reservation for the usage request, wherein
      the charging engine performs the updating, and
      the updating is based, at least in part, on the consumed portion of the balance reservation.

2. The method of claim 1, further comprising:
   determining whether to grant a requested balance reservation, wherein
      the update request further comprises
         the requested balance reservation, and
      the determining is based, at least in part, on
         the consumed balance reservation, and
         the requested balance reservation.

3. The method of claim 2, wherein the determining is further based, at least in part, on:
   a committed balance reservation, and
   an available balance.

4. The method of claim 2, further comprising:
   in response to a determination that the requested balance reservation should be granted,
      setting an active balance reservation, wherein
         the active balance reservation is set based, at least in part, on the requested balance reservation, and
      sending a response, wherein
         the response is configured to be sent from the charging engine to a session controller, and
         the response comprises information that indicates the charging engine has granted the requested balance reservation.

5. The method of claim 2, further comprising:
   determining whether a threshold could be exceeded, wherein
      the determining whether the threshold could be exceeded is based, at least in part, on
         the consumed balance reservation, and
         the requested balance reservation.

6. The method of claim 5, further comprising:
   in response to a determination that the threshold could be exceeded, sending a notification, wherein
      the notification indicates that the threshold could be exceeded.

7. The method of claim 2, wherein
   the updating is performed in response to a determination that the requested balance reservation should be granted.

8. The method of claim 7, further comprising:
   further in response to the determination that the requested balance reservation should be granted,
      determining whether one or more thresholds of a plurality of thresholds could be exceeded, wherein
         the determining whether the one or more thresholds of a plurality of thresholds could be exceeded is based, at least in part, on
            the consumed balance reservation, and
            an active balance reservation, and in response to a determination that one or more of the plurality of thresholds could be exceeded, sending one or more notifications, wherein
each of the one or more notifications corresponds to each of the one or more one or more of the plurality of thresholds.

9. The method of claim 8, wherein
the each of the one or more notifications corresponds to one of a plurality of subscribers.

10. The method of claim 1, wherein
the consumed portion of the balance reservation is a portion of a prior requested balance reservation.

11. The method of claim 1, further comprising:
receiving an end session message, wherein
the update request is an update session message,
the end session message is received at the charging engine, and
the end session message comprises
information regarding a consumed portion of an active balance reservation; and
in response to the receiving the end session message, updating the consumed balance reservation, wherein
the charging engine performs the updating the consumed balance reservation, and
the updating uses the consumed portion of the active balance reservation.

12. The method of claim 11, further comprising:
committing the consumed balance reservation to a committed balance reservation.

13. A computer system comprising:
one or more processors;
a computer-readable storage medium, wherein:
the computer-readable storage medium is coupled to the one or more processors, and
the computer system implements a charging engine; and
a plurality of instructions, encoded in the computer-readable storage medium and configured to cause the one or more processors to
receive, at the charging engine implemented on the one or more processors, a usage request for a subscriber of a telecommunications network and, in response, creating a balance reservation for the subscriber to reserve a first portion of pre-paid usage of the telecommunications network for the subscriber to satisfy the usage request;
receive an update request to update the usage request, wherein the update request is received at the charging engine, and the update request comprises information specifying a consumed portion of the balance reservation that the subscriber has consumed based on the usage request; and
in response to the receiving the update request, updating the balance reservation to reserve a second portion of the pre-paid usage of the telecommunications network based on the update request and the usage request and, separately, creating a consumed balance reservation for the usage request, wherein the charging engine performs the updating, and the updating is based, at least in part, on the consumed portion of the balance reservation.

14. The computer system of claim 13, wherein the plurality of instructions is further configured to cause the one or more processors to:
make a determination as to whether to grant a requested balance reservation, wherein
the update request further comprises
the requested balance reservation, and
the determination is based, at least in part, on
the consumed balance reservation, and
the requested balance reservation.

15. The computer system of claim 14, wherein the plurality of instructions is further configured to cause the one or more processors to:
in response to a determination that the requested balance reservation should be granted,
set an active balance reservation, wherein
the active balance reservation is set based, at least in part, on the requested balance reservation, and
send a response, wherein
the response is configured to be sent from the charging engine to a session controller, and
the response comprises information that indicates the charging engine has granted the requested balance reservation.

16. The computer system of claim 14, wherein the plurality of instructions is further configured to cause the processor to:
make a determination as to whether a threshold could be exceeded, wherein
the determination as to whether the threshold could be exceeded is based, at least in part, on
the consumed balance reservation, and
the requested balance reservation.

17. A non-transitory computer readable storage medium storing:
a first set of instructions, executable on a computer system, configured to
receive, at a charging engine implemented on one or more computing devices, a usage request for a subscriber of a telecommunications network and, in response, creating a balance reservation for the subscriber to reserve a first portion of pre-paid usage of the telecommunications network for the subscriber to satisfy the usage request;
receive an update request to update the usage request, wherein the update request is received at the charging engine, and the update request comprises information specifying a consumed portion of the balance reservation that the subscriber has consumed based on the usage request; and
in response to the receiving the update request, updating the balance reservation to reserve a second portion of the pre-paid usage of the telecommunications network based on the update request and the usage request and, separately, creating a consumed balance reservation for the usage request, wherein the charging engine performs the updating, and the updating is based, at least in part, on the consumed portion of the balance reservation.

18. The non-transitory computer readable storage medium of claim 17, wherein the instructions further comprise:
a third set of instructions, executable on the computer system, configured to make a determination as to whether to grant a requested balance reservation, wherein
the update request further comprises
the requested balance reservation, and
the determination is based, at least in part, on
the consumed balance reservation, and
the requested balance reservation.

19. The non-transitory computer readable storage medium of claim 18, wherein the instructions further comprise:

a third set of instructions, executable on the computer system, configured to, in response to a determination that the requested balance reservation should be granted,
- set an active balance reservation, wherein
  - the active balance reservation is set based, at least in part, on the requested balance reservation, and
- send a response, wherein
  - the response is configured to be sent from the charging engine to a session controller, and
  - the response comprises information that indicates the charging engine has granted the requested balance reservation.

20. The non-transitory computer readable storage medium of claim 18, wherein the instructions further comprise:
   - a third set of instructions, executable on the computer system, configured to make a make a determination as to whether a threshold could be exceeded, wherein
   - the determination as to whether the threshold could be exceeded is based, at least in part, on
     - the consumed balance reservation, and
     - the requested balance reservation.

\* \* \* \* \*

UNITED STATES PATENT AND TRADEMARK OFFICE
CERTIFICATE OF CORRECTION

PATENT NO. : 9,591,146 B2  
APPLICATION NO. : 14/503160  
DATED : March 7, 2017  
INVENTOR(S) : Guionnet et al.

Page 1 of 1

It is certified that error appears in the above-identified patent and that said Letters Patent is hereby corrected as shown below:

In the Specification

In Column 29, Line 3, delete "(HBA0)" and insert -- (HBA) --, therefor.

In the Claims

In Column 33, Line 5, in Claim 8, delete "one or more one or more" and insert -- one or more --, therefor.

In Column 35, Line 17, in Claim 20, delete "make a make a" and insert -- make a --, therefor.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*